United States Patent
Ozawa et al.

(10) Patent No.: US 9,235,773 B2
(45) Date of Patent: Jan. 12, 2016

(54) IMAGE PROCESSING DEVICE CAPABLE OF DETERMINING TYPES OF IMAGES ACCURATELY

(71) Applicant: BROTHER KOGYO KABUSHIKI KAISHA, Nagoya-shi, Aichi-ken (JP)

(72) Inventors: Ryohei Ozawa, Nagoya (JP); Masaki Kondo, Toyoake (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 155 days.

(21) Appl. No.: 13/802,294

(22) Filed: Mar. 13, 2013

(65) Prior Publication Data

US 2013/0259373 A1 Oct. 3, 2013

(30) Foreign Application Priority Data

Mar. 30, 2012 (JP) ................................ 2012-082438

(51) Int. Cl.
*G06K 9/34* (2006.01)
*G06K 9/00* (2006.01)
*H04N 1/40* (2006.01)

(52) U.S. Cl.
CPC .............. *G06K 9/34* (2013.01); *G06K 9/00456* (2013.01); *H04N 1/40062* (2013.01)

(58) Field of Classification Search
CPC ........................ G06K 9/00456; H04N 1/40062
USPC .................... 382/171, 176, 224; 358/453, 462
See application file for complete search history.

(56) References Cited

U.S. PATENT DOCUMENTS

| | | | | |
|---|---|---|---|---|
| 5,278,919 | A * | 1/1994 | Sugiura et al. | 382/176 |
| 5,613,015 | A * | 3/1997 | Suzuki et al. | 382/173 |
| 5,729,626 | A * | 3/1998 | Hada et al. | 382/170 |
| 6,674,900 | B1 * | 1/2004 | Ma et al. | 382/176 |
| 6,983,068 | B2 * | 1/2006 | Prabhakar et al. | 382/162 |
| 2004/0136604 | A1* | 7/2004 | Kuwata et al. | 382/254 |
| 2005/0234875 | A1* | 10/2005 | Auerbach et al. | 707/3 |
| 2006/0067575 | A1* | 3/2006 | Yamada | 382/176 |
| 2009/0003700 | A1* | 1/2009 | Xiao et al. | 382/176 |
| 2009/0244564 | A1* | 10/2009 | Kondo et al. | 358/1.9 |
| 2009/0316228 | A1* | 12/2009 | Matsushita et al. | 358/474 |
| 2012/0121139 | A1* | 5/2012 | Kojima et al. | 382/112 |
| 2014/0092441 | A1* | 4/2014 | Nishizaki | 358/3.06 |

FOREIGN PATENT DOCUMENTS

| | | |
|---|---|---|
| JP | H05-225378 A | 9/1993 |
| JP | 2002-176564 A | 6/2002 |

* cited by examiner

*Primary Examiner* — Yubin Hung
(74) *Attorney, Agent, or Firm* — Merchant & Gould PC

(57) ABSTRACT

An image processing device performs: acquiring image data representing an image, the image data including a plurality of sets of pixel data each having a multiple-level gradation value, each gradation value falling within a predetermined range between and inclusive of a minimum gradation value and a maximum gradation value, a predetermined number of levels of gradation value falling within the predetermined range; setting a partial range of levels of gradation value, a first number of levels of gradation value in the partial range being smaller than the predetermined number; and determining that the image is a photograph image when the image meets a first criterion that a degree of change in distribution of gradation values is smaller than a reference value, the distribution of gradation value indicating a pixel number of sets of pixel data for each level of the gradation value falling within the partial range.

16 Claims, 12 Drawing Sheets

FIG. 5

|   |   |   |   |   |   |   |   |   |   |   |   |   |   |   |   |   |   |   |   |
|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 0 | 0 | 0 | 0 | 0 | 0 | 1 |
| 1 | 1 | 1 | 1 | 1 | 1 | 1 | 1 | 1 | 1 | 1 | 1 | 1 | 0 | 0 | 0 | 0 | 0 | 0 | 1 |
| 1 | 1 | 1 | 1 | 1 | 1 | 1 | 1 | 1 | 1 | 1 | 1 | 1 | 0 | 0 | 0 | 0 | 0 | 0 | 1 |
| 1 | 1 | 1 | 1 | 1 | 1 | 1 | 1 | 1 | 1 | 1 | 1 | 1 | 0 | 0 | 0 | 0 | 0 | 0 | 1 |
| 1 | 1 | 1 | 1 | 1 | 1 | 1 | 1 | 1 | 1 | 1 | 1 | 1 | 0 | 0 | 0 | 0 | 0 | 0 | 1 |
| 1 | 1 | 0 | 0 | 0 | 0 | 0 | 0 | 0 | 0 | 1 | 1 | 1 | 1 | 1 | 1 | 1 | 1 | 1 | 1 |
| 1 | 1 | 0 | 0 | 0 | 0 | 0 | 0 | 0 | 0 | 1 | 1 | 0 | 0 | 0 | 0 | 0 | 1 | 1 | 1 |
| 1 | 1 | 0 | 0 | 0 | 0 | 0 | 0 | 0 | 0 | 1 | 1 | 0 | 0 | 0 | 0 | 0 | 1 | 1 | 1 |
| 1 | 1 | 0 | 0 | 0 | 0 | 0 | 0 | 0 | 0 | 1 | 1 | 0 | 0 | 0 | 0 | 0 | 0 | 0 | 1 |
| 1 | 1 | 0 | 0 | 0 | 0 | 0 | 0 | 0 | 0 | 1 | 1 | 1 | 0 | 0 | 0 | 0 | 0 | 0 | 1 |
| 1 | 1 | 1 | 1 | 1 | 1 | 1 | 1 | 1 | 1 | 1 | 1 | 1 | 0 | 0 | 0 | 0 | 0 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 |

FIG. 6

|   |   |   |   |   |   |   |   |   |   |   |   |   |   |   |   |   |   |   |   |
|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 3 | 3 | 3 | 3 | 3 | 3 | 3 | 1 |
| 1 | 1 | 1 | 1 | 1 | 1 | 1 | 1 | 1 | 1 | 1 | 1 | 3 | 3 | 3 | 3 | 3 | 3 | 3 | 1 |
| 1 | 1 | 1 | 1 | 1 | 1 | 1 | 1 | 1 | 1 | 1 | 1 | 3 | 3 | 3 | 3 | 3 | 3 | 3 | 1 |
| 1 | 1 | 1 | 1 | 1 | 1 | 1 | 1 | 1 | 1 | 1 | 1 | 3 | 3 | 3 | 3 | 3 | 3 | 3 | 1 |
| 1 | 1 | 1 | 1 | 1 | 1 | 1 | 1 | 1 | 1 | 1 | 1 | 3 | 3 | 3 | 3 | 3 | 3 | 3 | 1 |
| 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 2 | 2 | 2 | 2 | 2 | 2 | 2 | 1 | 1 | 1 | 1 | 4 | 4 | 4 | 1 | 1 | 1 | 1 |
| 1 | 1 | 2 | 2 | 2 | 2 | 2 | 2 | 2 | 1 | 1 | 1 | 1 | 4 | 4 | 4 | 1 | 1 | 1 | 1 |
| 1 | 1 | 2 | 2 | 2 | 2 | 2 | 2 | 2 | 1 | 1 | 1 | 1 | 4 | 4 | 4 | 1 | 1 | 1 | 1 |
| 1 | 1 | 2 | 2 | 2 | 2 | 2 | 2 | 2 | 1 | 1 | 1 | 1 | 4 | 4 | 4 | 4 | 1 | 1 | 1 |
| 1 | 1 | 1 | 1 | 1 | 1 | 1 | 1 | 1 | 1 | 1 | 1 | 1 | 4 | 4 | 4 | 4 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 |

FIG. 11

| MAXIMUM FREQUE-NCY RATE (W) | COLOR NUMBER (C) | PIXEL DENSITY (C) | EDGE ASSESMENT VALUE (E) | DETERMINATION RESULT |
|---|---|---|---|---|
| GREATER THAN OR EQUAL TO Wth | GREATER THAN OR EQUAL TO Cth | / | / | PHOTO |
| | SMALLER THAN Cth | GREATER THAN OR EQUAL TO Dth | / | DRAWING |
| | | SMALLER THAN Dth | GREATER THAN OR EQUAL TO Eth | TEXT |
| | | | SMALLER THAN Eth | DRAWING |
| SMALLER THAN Wth | GREATER THAN OR EQUAL TO Cth | / | / | DRAWING |
| | SMALLER THAN Cth | GREATER THAN OR EQUAL TO Dth | / | DRAWING |
| | | SMALLER THAN Dth | GREATER THAN OR EQUAL TO Eth | TEXT |
| | | | SMALLER THAN Eth | DRAWING |

C=C3+C4+C5

IMAGE PROCESSING DEVICE CAPABLE OF DETERMINING TYPES OF IMAGES ACCURATELY

CROSS REFERENCE TO RELATED APPLICATION

This application claims priority from Japanese Patent Application No. 2012-082438 filed Mar. 30, 2012. The entire content of the priority application is incorporated herein by reference.

TECHNICAL FIELD

The present invention relates to an image processing device.

BACKGROUND

There are techniques known in the art for analyzing regions of an image (hereinafter referred to as target regions) based on image data representing the image in order to determine the type of the region (photo and text, for example). There are advantages in correctly determining the types of target regions, such as being able to process target regions using image processes that are most suitable for the image types. According to one technology known in the art, an image processor divides an image into a plurality of blocks and calculates the contrast for each block. Subsequently, the image processor categorizes each block as a photograph, text, and the like based on their contrast.

SUMMARY

However, correctly determining the type of an image is difficult, and the conventional technology has been susceptible to false determinations.

In view of the foregoing, it is an object of the present invention to provide a technology capable of determining the types of images with greater accuracy.

In order to attain the above and other objects, the invention provides an image processing device. The image processing device includes a processor and a memory storing computer-readable instructions therein. The computer-readable instructions, when executed by the processor, causes the image processing device to perform: acquiring image data representing an image, the image data including a plurality of sets of pixel data each having a multiple-level gradation value, each gradation value falling within a predetermined range between and inclusive of a minimum gradation value and a maximum gradation value, a predetermined number of levels of gradation value falling within the predetermined range; setting a partial range of levels of gradation value, a first number of levels of gradation value in the partial range being smaller than the predetermined number; and determining that the image is a photograph image when the image meets a first criterion that a degree of change in distribution of gradation values is smaller than a reference value. The distribution of gradation value indicates a pixel number of sets of pixel data for each level of the gradation value falling within the partial range.

According to another aspect, the present invention provides a non-transitory computer readable storage medium storing instructions, when executed by a processor, causing an image processing device to perform: acquiring image data representing an image, the image data including a plurality of sets of pixel data each having a multiple-level gradation value, each gradation value falling within a predetermined range between and inclusive of a minimum gradation value and a maximum gradation value, a predetermined number of levels of gradation value falling within the predetermined range; setting a partial range of levels of gradation value, a first number of levels of gradation value in the partial range being smaller than the predetermined number; and determining that the image is a photograph image when the image meets a first criterion that a degree of change in distribution of gradation values is smaller than a reference value, the distribution of gradation value indicating a pixel number of sets of pixel data for each level of the gradation value falling within the partial range.

According to another aspect, the present invention provides a method executed by an image processing device, the method including: acquiring image data representing an image, the image data including a plurality of sets of pixel data each having a multiple-level gradation value, each gradation value falling within a predetermined range between and inclusive of a minimum gradation value and a maximum gradation value, a predetermined number of levels of gradation value falling within the predetermined range; setting a partial range of levels of gradation value, a first number of levels of gradation value in the partial range being smaller than the predetermined number; and determining that the image is a photograph image when the image meets a first criterion that a degree of change in distribution of gradation values is smaller than a reference value, the distribution of gradation value indicating a pixel number of sets of pixel data for each level of the gradation value falling within the partial range.

BRIEF DESCRIPTION OF THE DRAWINGS

The particular features and advantages of the invention as well as other objects will become apparent from the following description taken in connection with the accompanying drawings, in which:

FIG. 5 is an explanatory diagram showing an example of determination image;

FIG. 6 is an explanatory diagram showing an example of label image;

FIG. 11 is an example of a determination table indicating conditions for determining types of images;

DETAILED DESCRIPTION

A. Embodiment

A-1. Structure of an Image Processing Device

Figure 1:
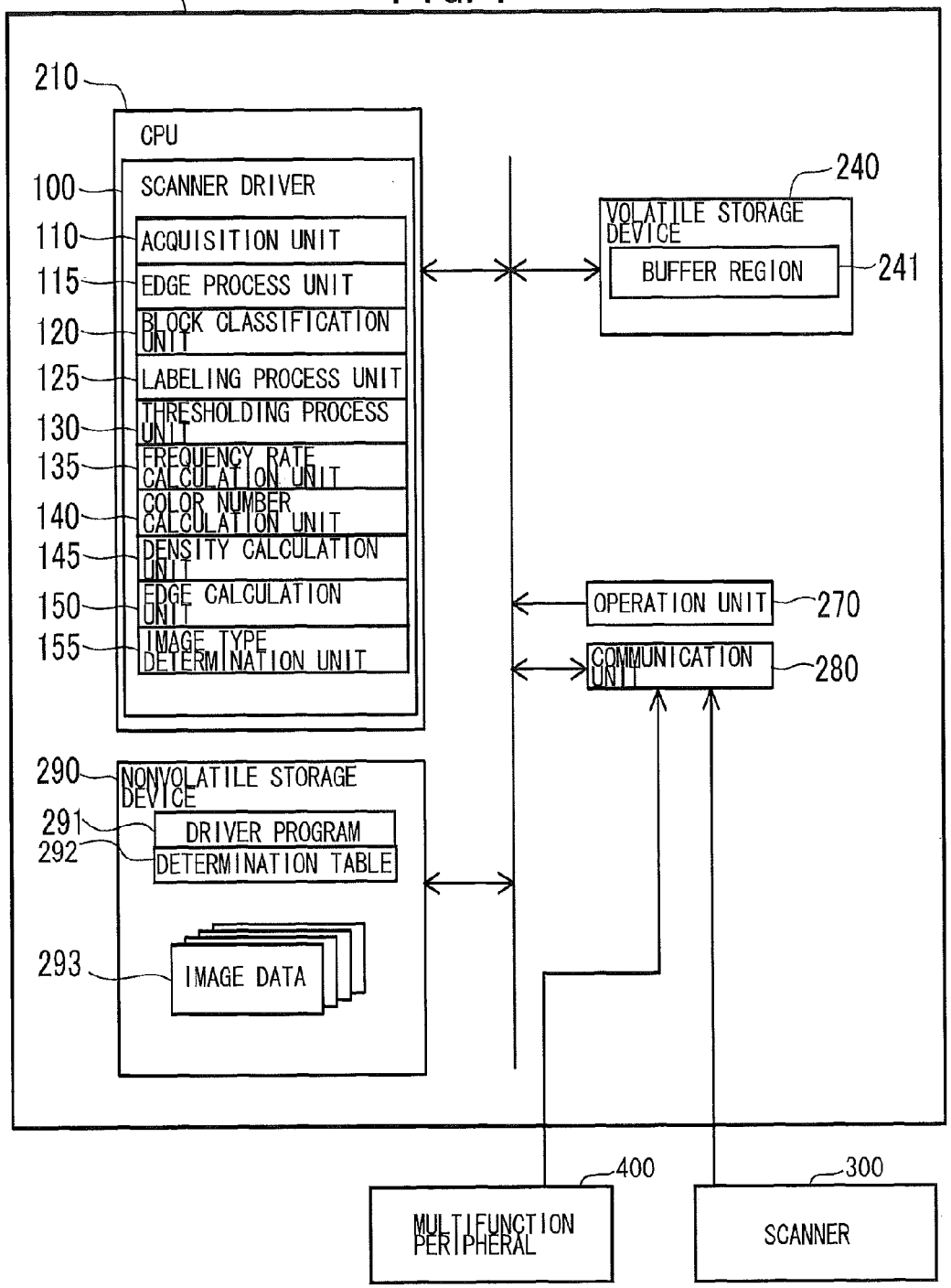
FIG. 1 is a block diagram showing a structure of an image processing device according to an embodiment of the present invention.

As shown in FIG. 1, a computer 200 is a personal computer that includes a CPU 210; a volatile storage device 240, such as a DRAM; an operating unit 270, such as a mouse and keyboard; a communication unit 280 that enables the computer 200 to communicate with external devices; and a nonvolatile storage device 290, such as a hard disk drive and flash memory.

The computer 200 is connected to and capable of communicating with a scanner 300 and a multifunction peripheral 400, both external devices, via the communication unit 280. The scanner 300 is an image-reading device that acquires scan data by optically reading an original. The multifunction peripheral 400 includes an image-reading unit (not shown) for acquiring scan data by optically reading an original.

The volatile storage device 240 is provided with a buffer region 241 for temporarily storing various intermediate data generated when the CPU 210 performs processes. The nonvolatile storage device 290 stores a driver program 291, a determination table 292, and image data 293 generated in an image process described later. The driver program 291 is supplied on a CD-ROM or DVD-ROM, for example. The driver program 291 may also be recorded on and used from a computer-readable storage medium, whether it be the same on which the driver program 291 is provided or a different medium.

By executing the driver program 291, the CPU 210 functions as a scanner driver 100. The scanner driver 100 includes an image-processing function for executing an image process described later. The scanner driver 100 is configured of a data acquisition unit 110, an edge process unit 115, a block classification unit 120, a labeling process unit 125, a thresholding process unit 130, a frequency rate calculation unit 135, a color number calculation unit 140, a density calculation unit 145, an edge calculation unit 150, and an image type determination unit 155. These functional units execute steps in an image process described later. A region determination process described later is implemented by the frequency rate calculation unit 135, color number calculation unit 140, density calculation unit 145, edge calculation unit 150, and image type determination unit 155.

A-2. Image Process

Figure 2:
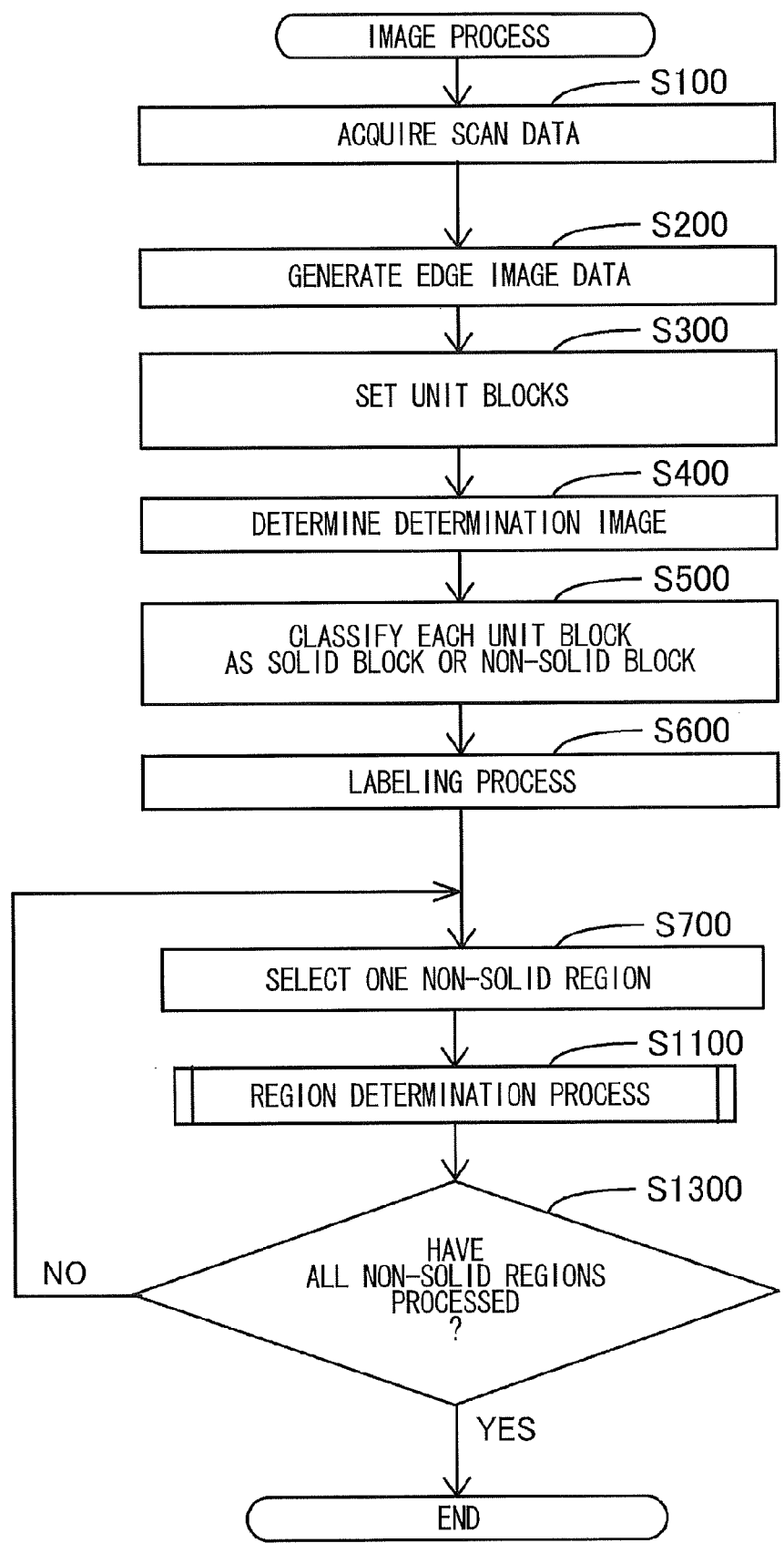
FIG. 2 is a flowchart illustrating steps in an image process executed by the image processing device.

FIG. 2 is a flowchart illustrating steps in the image process of the preferred embodiment. The scanner driver 100 executes this image process in order to identify types of object images included in the scanned image represented by scan data.

In S100 of FIG. 2, the data acquisition unit 110 of the scanner driver 100 acquires scan data to be processed. More specifically, the data acquisition unit 110 controls the scanner 300 or an image-reading unit of the multifunction peripheral 400 to generate scan data, and acquires this scan data. The scan data is bitmap data configured of a plurality of sets of RGB pixel data. RGB pixel data includes three component values for each pixel corresponding to the colors red (R), green (G), and blue (B) (each component value in the preferred embodiment being a 256-level gradation value).

Figure 3:
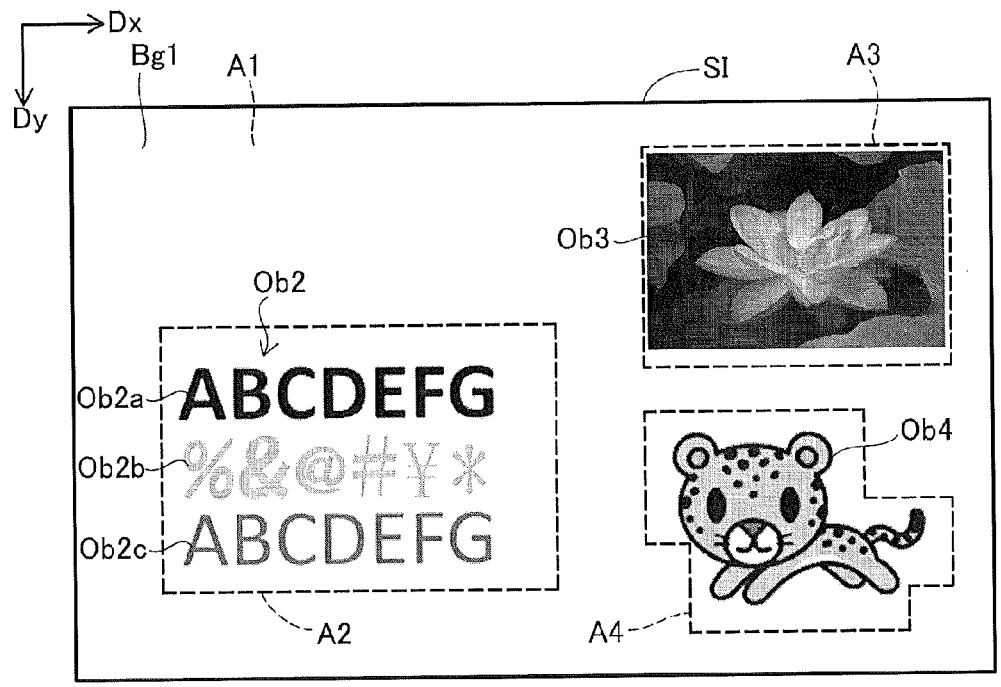
FIG. 3 is an explanatory diagram showing an example of a scanned image.

FIG. 3 shows an example of a scanned image SI represented by scan data. As shown in FIG. 3, the scanned image SI includes a background image Bg1, a text object image Ob2 representing text, a photo object image Ob3 representing a photograph, and a drawing object image Ob4 representing a drawing. Here, a drawing object image may be an image representing an illustration, table, diagram, pattern, or the like. In this example, the background image Bg1 will have a light gray color. The text object image Ob2 further includes three character strings Ob2a, Ob2b, and Ob2c. Each character string is expressed in a different color. In the image process described below, the image data acquired by the data acquisition unit 110 in S100 will be scan data representing the scanned image SI in FIG. 3.

After the data acquisition unit 110 acquires scan data in S100 of FIG. 2, in S200 the edge process unit 115 executes an edge detection process on the scan data using a Sobel filter configured of 3×3 pixels (an array of 3 pixels vertically and 3 pixels horizontally). By executing this edge detection process, the edge process unit 115 generates edge image data representing an edge image EGI.

Specifically, the edge process unit 115 executes the following color component data generation process on each color component (red, green, and blue components) in the scan data. In this process, the edge process unit 115 lays out the Sobel filter on a target pixel (x, y) in the scanned image SI, where coordinate x indicates the pixel position in a first direction Dx, and coordinate y indicates the pixel position in a second direction Dy orthogonal to the first direction Dx. The edge process unit 115 calculates an edge strength ES(x, y) with Equation 1 below using component values P for nine pixels centered on the target pixel (x, y), where the component values P are values of the color component currently being processed (target color component). Next, the edge process unit 115 performs a first process to set the value of the target color component in the target pixel to the edge strength ES(x, y) calculated above.

The edge process unit 115 executes the color component data generation process to generate edge image data corresponding to the target color component by selecting each pixel in the scanned image SI to serve as the target pixel and executing the first process on each target pixel. The edge process unit 115 performs the edge detection process to execute this color component data generation process on each of the RGB color components.

$$ES(x, y) = \left| \begin{bmatrix} -1 & 0 & 1 \\ -2 & 0 & 2 \\ -1 & 0 & 1 \end{bmatrix} \begin{bmatrix} P\!\left(\begin{smallmatrix}x-1,\\y-1\end{smallmatrix}\right) & P(x, y-1) & P\!\left(\begin{smallmatrix}x+1,\\y-1\end{smallmatrix}\right) \\ P(x-1, y) & P(x, y) & P(x+1, y) \\ P\!\left(\begin{smallmatrix}x-1,\\y+1\end{smallmatrix}\right) & P(x, y+1) & P\!\left(\begin{smallmatrix}x+1,\\y+1\end{smallmatrix}\right) \end{bmatrix} \right| +$$

$$\left| \begin{bmatrix} -1 & -2 & -1 \\ 0 & 0 & 0 \\ 1 & 2 & 1 \end{bmatrix} \begin{bmatrix} P\!\left(\begin{smallmatrix}x-1,\\y-1\end{smallmatrix}\right) & P(x, y-1) & P\!\left(\begin{smallmatrix}x+1,\\y-1\end{smallmatrix}\right) \\ P(x-1, y) & P(x, y) & P(x+1, y) \\ P\!\left(\begin{smallmatrix}x-1,\\y+1\end{smallmatrix}\right) & P(x, y+1) & P\!\left(\begin{smallmatrix}x+1,\\y+1\end{smallmatrix}\right) \end{bmatrix} \right|$$

(Equation 1)

As shown above in Equation 1, the nine pixels are neighboring pixels arranged in three rows and three columns and centered on pixel position (x, y) in this scanned image SI corresponding to pixel position (x, y) in the edge image EGI. The first and second operators in Equation 1 are each the absolute value of the sum of products obtained by multiplying the component values of the nine pixels by corresponding coefficients. The edge strength ES of (x, y) represents the magnitude of change in component values between the target pixel and its peripheral pixels, with the first operator in Equation 1 computing the magnitude of change in the first direction Dx and the second operator computing the magnitude of change in the second direction Dy. Note that other edge detection filters may be used in place of the Sobel filter for generating the edge image EGI, such as the Prewitt filter or the Roberts filter.

Figure 4:
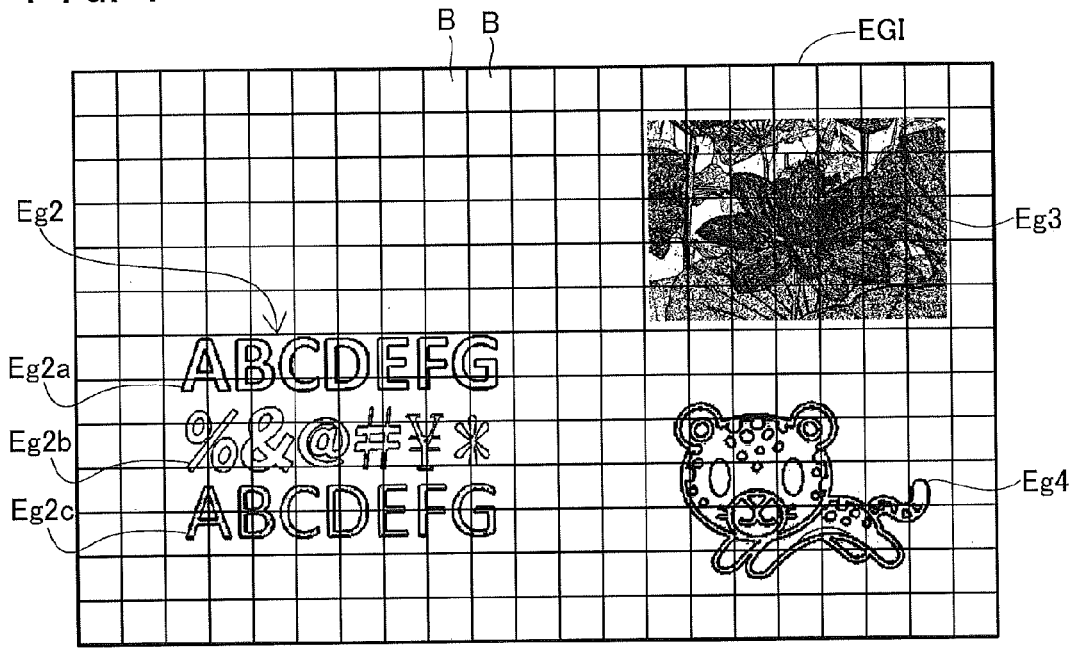
FIG. 4 is an explanatory diagram showing an example of an edge image.

FIG. 4 shows an example of the edge image EGI represented by edge image data. In FIG. 4, pixels having an edge strength smaller than a prescribed threshold are depicted in white, while pixels having an edge strength greater than the prescribed threshold are depicted in black. The edge image EGI in the example of FIG. 4 includes edges Eg2-Eg4 for the corresponding object images Ob2-Ob4 in the scanned image SI. The edge Eg3 represents edges of the photo object image Ob3. The edge Eg4 represents edges of the drawing object image Ob4. The edge Eg2 includes edges Eg2a, Eg2b, and Eg2c that respectively represent edges of the character strings Ob2a, Ob2b, and Ob2c in the scanned image SI.

In S200 of FIG. 2, the block classification unit 120 configures a plurality of blocks B (see FIG. 4) for the edge image EGI. The blocks B are arranged as a grid in relation to the edge image EGI. A single block B is equivalent to the size of N×N pixels (where N is a prescribed natural number), for example. N is set to a value between 10 and 50. Since the edge image EGI and scanned image SI are identical in size (have the same number of pixels, both vertically and horizontally), it can also be said that the blocks B are configured for the scanned image SI.

In S400 of FIG. 2, the block classification unit 120 configures a determination image BI. FIG. 5 shows an example of the determination image BI. The determination image BI is configured of pixels BP corresponding one-on-one with the plurality of unit blocks B described above. Each pixel BP in the determination image BI has a value related to the edge strength of the corresponding unit block B. At S400 in the image process, the values of all pixels BP in the determination image BI have been set to "0".

In S500 of FIG. 2, the block classification unit 120 performs a determination to classify each unit block B as a solid block or a non-solid block. Specifically, the block classification unit 120 calculates average edge strengths ERave, EGave, and EBave for each unit block B in the scanned image SI. The average edge strengths ERave, EGave, and EBave are average values of the corresponding components R, G, and B averaged for all pixels in the unit block B of the edge image EGI. The block classification unit 120 compares the average edge strengths of the unit block B to prescribed reference values in order to classify the unit block B as either a solid block or a non-solid block. A solid block has smaller average edge strengths than the corresponding reference values, while a non-solid block has average edge strengths greater than or equal to the reference values.

For example, the block classification unit 120 compares the average edge strengths ERave, EGave, and EBave to reference values ETr, ETg, and ETb set for corresponding color components. If ERave<ETr, EGave<ETg, and EBave<ETb, the block classification unit 120 classifies the target unit block B as a solid block. Conversely, if even one of the expressions ERave≥ETr, EGave≥ETg, and EBave≥ETb is satisfied, than the block classification unit 120 classifies the target unit block B as a non-solid block.

After each determination is performed for a target unit block B, i.e., after each unit block B is classified as either a solid block or a non-solid block, the block classification unit 120 converts the value of the pixel BP corresponding to the target unit block B to a value reflecting the determination results. More specifically, the block classification unit 120 updates the value of the pixel BP corresponding to the determination image BI to "1" when the target unit block B is classified as a solid block, but leaves the value of the pixel BP unchanged (keeps the pixel BP at a value of "0") when the target unit block B is classified as a non-solid block.

After the block classification unit 120 has classified all unit blocks B, the values for all pixels BP in the determination image BI have been set to either "0" or "1", as illustrated in FIG. 5. A pixel value of "0" indicates that the unit block B corresponding to the pixel BP has been classified as a non-solid block, while a pixel value of "1" indicates that the unit block B corresponding to the pixel BP has been classified as a solid block.

After classifying unit blocks B as solid blocks or non-solid blocks in S500 of FIG. 2, in S600 the labeling process unit 125 executes a labeling process for identifying solid regions and non-solid regions in the scanned image SI. Specifically, the labeling process unit 125 identifies each region in the determination image BI configured of contiguous pixels BP having the pixel value "0" as a single non-solid region, and identifies each region configured of contiguous pixels BP having the pixel value "1" as a single solid region. Next, the labeling process unit 125 modifies pixel values in the determination image BI so that all pixels BP belonging to the same region have the same pixel value and pixels BP belonging to different regions have different pixel values. The result of this process is a label image LI.

FIG. 6 shows an example of the label image LI. The label image LI is configured of pixels LB corresponding one-on-one to the plurality of pixels BP in the determination image BI. As shown in FIG. 6, the label image LI identifies image regions configured of pixels with the same pixel value. Identifiers for identifying each solid region and non-solid region are assigned to each pixel LB constituting the respective solid region and non-solid region. In the example of FIG. 6, identifiers "1" through "4" have been assigned to pixels LB constituting image regions PG1-PG4, respectively, thereby identifying the four image regions PG1-PG4. These four image regions PG1-PG4 respectively correspond to solid regions and non-solid regions in the edge image EGI configured of consolidated unit blocks B and, hence, regions in the scanned image SI configured of consolidated pixels. The image region PG1 is a solid region because it corresponds to a region in the determination image BI having pixels BP assigned the value "1" in S500. The image regions PG2-PG4 are non-solid regions because they correspond to regions having pixels BP assigned the value "0" in S500.

As a result of the above process, the labeling process unit 125 identifies the image regions A2, A3, and A4 in the scanned image SI indicated by dashed lines in FIG. 3 as non-solid regions, and identifies an image region A1, excluding the image regions A2, A3, and A4, as a solid region. From FIG. 3 it is clear that the non-solid regions A2, A3, and A4 correspond to the object images Ob2, Ob3, and Ob4, respectively. Similarly, the solid region A1 corresponds to the background image Bg1. As shown in FIG. 6, continuous non-solid blocks are identified as a single non-solid region. Therefore, non-solid regions are normally surrounded by solid regions.

After completing the labeling process in S600 of FIG. 2 for assigning an identifier to each region, in S700 the image type determination unit 155 selects one non-solid region from among the non-solid regions identified in the scanned image SI (image regions A2-A4) as a target region. In S1100 the scanner driver 100 executes a region determination process on the target region to determine the type of image in the selected non-solid region.

Figure 7:
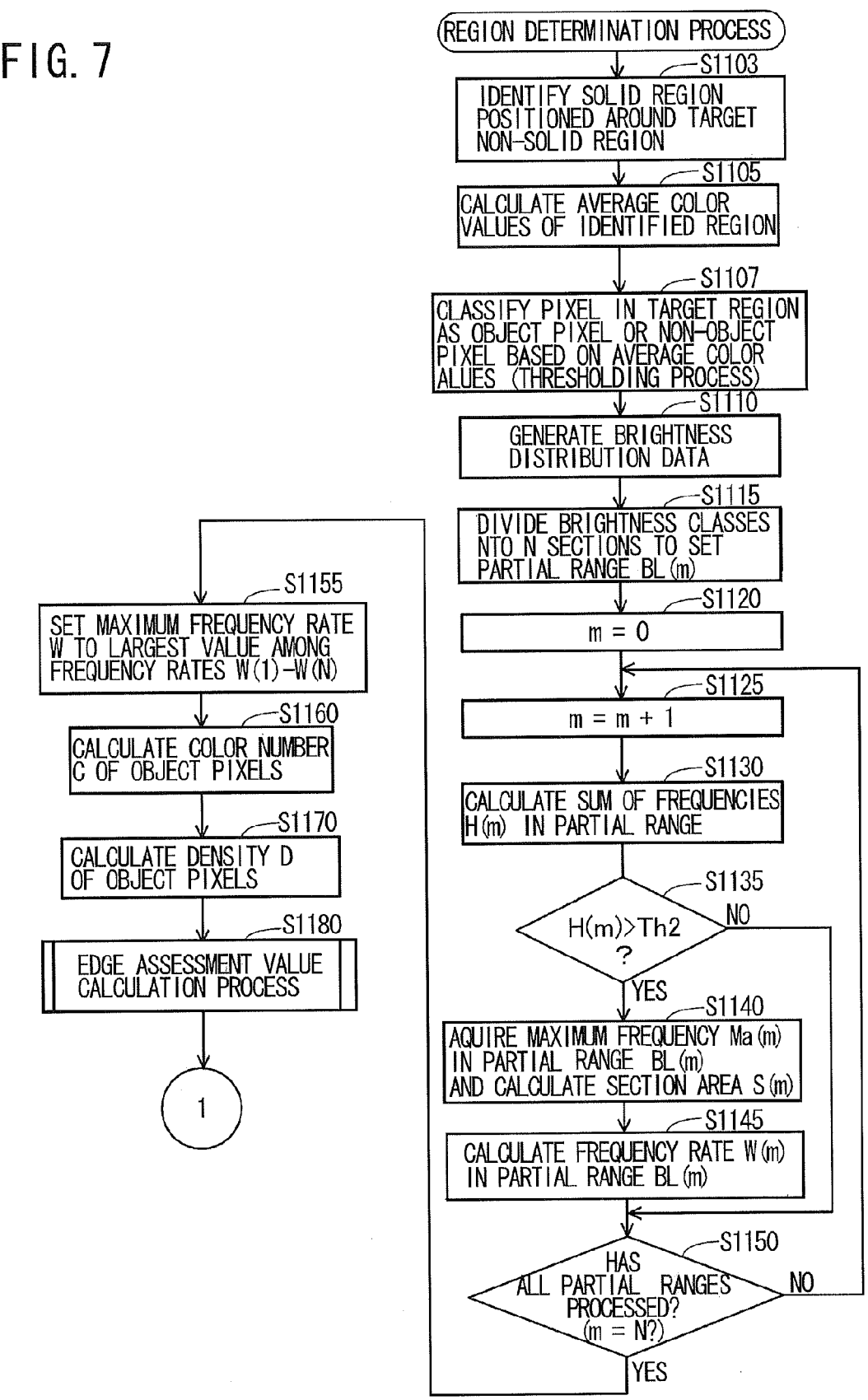
FIGS. 7 and 8 are flowcharts illustrating steps in a region determination process of the image process shown in FIG. 2.
Figure 8:
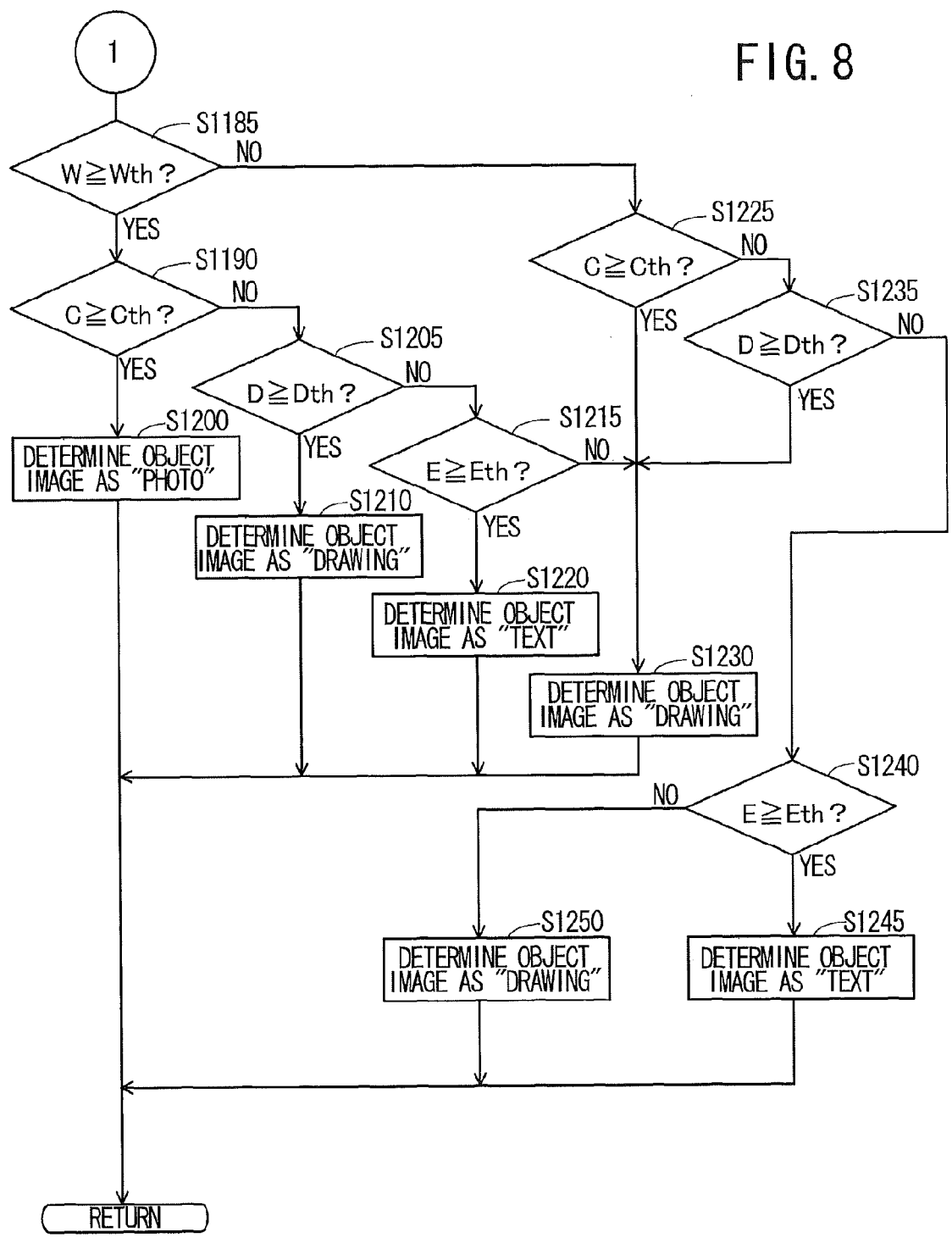

FIGS. 7 and 8 are flowcharts illustrating steps in the region determination process. FIG. 9 shows explanatory diagrams for the region determination process. In S1103 at the beginning of the process in FIG. 7, the thresholding process unit 130 identifies a solid region positioned around the target non-solid region (hereinafter the region positioned around the target non-solid region will be referred to as a "peripheral region"). For example, if the target non-solid region is the image region A2 in FIG. 3, the thresholding process unit 130 identifies the entire image region A1 corresponding to the background image Bg1 as the peripheral region. Alternatively, the thresholding process unit 130 may identify just a portion of the image region A1, such as the portion nearest the target image region A2, as the peripheral region. For example, the thresholding process unit 130 may set the peripheral region to the portion of the image corresponding to the region RI in the label image LI of FIG. 6, i.e., a ring-like region in the image region A1 corresponding to the background image Bg1 having a prescribed width (a width equivalent to one unit block B, for example) and surrounding the periphery of the target region.

In S1105 the thresholding process unit 130 calculates average gradation values ARave, AGave, and ABave for the corresponding color components in the peripheral region of the determination image BI identified in S1103. In other words, the thresholding process unit 130 calculates the average value of each component value (gradation value) in the RGB image data for all pixels constituting the peripheral region. Here, the mode, median, or other value may be used in place of the average value.

In S1107 the thresholding process unit 130 performs thresholding on the target region using the average gradation values ARave, AGave, and ABave. That is, the thresholding process unit 130 converts the pixel values of each pixel constituting the target region to "0" or "1", thereby classifying each pixel constituting the target region as an object pixel corresponding to "1" or a non-object pixel (a pixel representing the background image) corresponding to "0". More specifically, the thresholding process unit 130 sets the value of a pixel i to "0" when component values Ri, Gi, and Bi in the RGB pixel data for the pixel i constituting the target region satisfy all Equations 2-4 below, and sets the value of pixel i to "1" when even one of Equations 2-4 is not satisfied.

$$|Ri-ARave| < Th1 \quad \text{(Expression 2)}$$

$$|Gi-AGave| < Th1 \quad \text{(Expression 3)}$$

$$|Bi-ABave| < Th1 \quad \text{(Expression 4)}$$

From Expressions 2-4 it can be seen that pixel i is classified as a non-object pixel when the absolute value of the difference between the average color value (average gradation value) in the peripheral region and the component value of pixel i in the target region is less than a threshold Th1 for all color components. The pixel i is classified as an object pixel when the absolute value described above for at least one color component is greater than or equal to the threshold Th1. The image generated through the thresholding process of S1107, i.e., the image representing the results of identifying object pixels and non-object pixels is called a binary image.

Figure 9A:
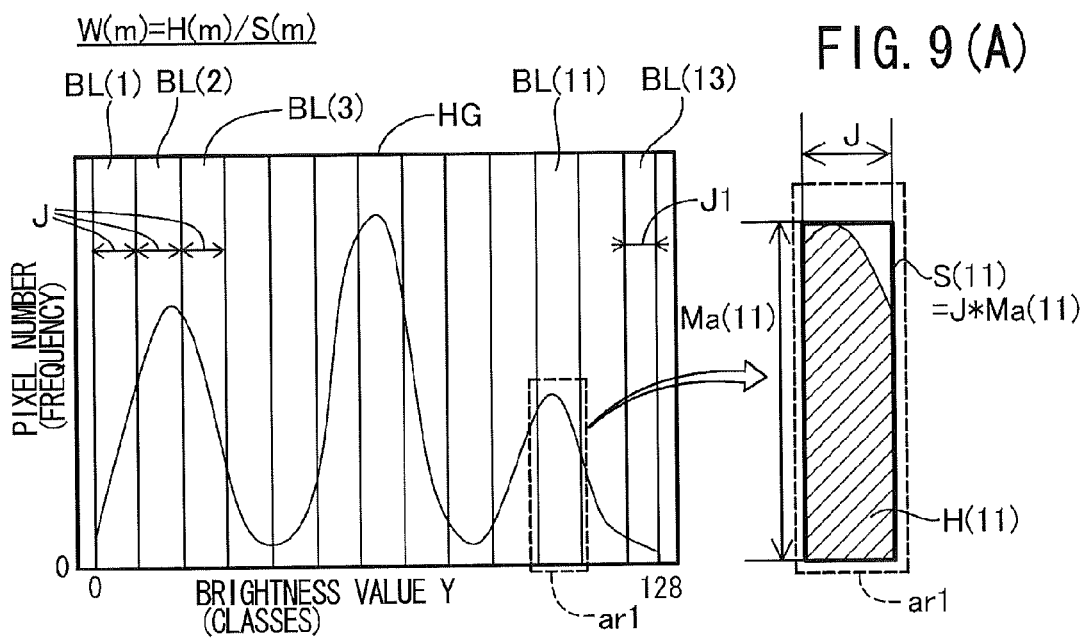
FIG. 9(A) is an explanatory diagram showing an example of histogram representing brightness distribution.

After performing the thresholding process on the target region in S1107, in S1110 the frequency rate calculation unit 135 generates histogram data showing the brightness distribution of object pixels in the target region. The graph in FIG. 9(A) shows an example of a histogram HG representing the brightness distribution. The histogram HG in FIG. 9(A) is produced by plotting pixel counts on the vertical axis for each of the 256 brightness values Y on the horizontal axis. The frequency rate calculation unit 135 generates brightness distribution data representing the histogram HG by calculating the brightness value Y for each object pixel and counting the number of pixels (frequency) possessing the brightness value Y that are included in a class representing a range of brightness values Y, and performs this calculation for each class. In the preferred embodiment, the brightness value Y can represent any of 256 gradation values. Each class of brightness values Y in the histogram HG of FIG. 9(A) includes two of the 256 gradation levels. Hence, brightness values Y in the histogram of this example represent 128 classes. The brightness values Y and classes have a mutual relationship. The frequency rate calculation unit 135 calculates the brightness value Y for each object pixel in the target region by inserting the RGB pixel data (the gradation values for the red, green, and blue color components of the object pixel) into Equation 5 below, for example.

$$\text{Brightness value } Y=((0.298912 \times R)+(0.586611 \times G)+(0.114478 \times B)) \quad \text{(Equation 5)}$$

The size of the brightness distribution data (bit number) is determined by the product of the number of classes of brightness values Y in the histogram HG and the maximum pixel count (frequency) corresponding to each class. Hence, by setting each class of brightness values Y in the histogram HG to include two of the 256 gradations, as described above, the brightness distribution data can be compressed to half the size of data produced when each class of the brightness values Y3 corresponds to one of the 256 gradations.

After generating the brightness distribution data in S1110 representing the distribution of brightness values (histogram) for object pixels in the target region, in S1115 the frequency rate calculation unit 135 divides the classes (levels) of brightness values Y in the histogram into N sections (where N is an integer of 2 or greater), as illustrated in FIG. 9(A). Each section of classes (gradation values) will be called a partial range BL(m) (where m is a variable set to an integer within the range from 1 to N). More specifically, the frequency rate calculation unit 135 divides the classes of brightness values Y into sections of J classes, beginning from class "0" (where J is an integer of at least 2 or greater and no larger than (K−1), and K is the total number of classes of brightness values Y). The value of m in the partial range BL(m) is smaller when the classes included in the partial range BL(m) have smaller numbers, and larger when the classes have larger numbers. If K is indivisible by J, the number of classes in the last partial range BL(N) is smaller than J. Hereinafter, the number of classes in the last partial range BL(N) will be called J1. If K is divisible by J, the value of J1 is equivalent to the value of J.

In the preferred embodiment, the total number of classes K is set to 128 as described above, the number of classes J included in a single partial range BL(m) is set to "10", and the total number of partial range BL(m) N is set to "13". Accordingly, a total of thirteen, partial ranges are set in the preferred embodiment (partial ranges BL(1)-BL(13)). In this example, partial range BL(1) is the range of classes including class "0", and partial range BL(13) is the range of classes including class "128". The number of classes J of brightness values Y included in each of the partial ranges BL(1)-BL(12) is "10", while the number of classes J1 of brightness values Y included in the last partial range BL(13) is "8". The brightness value Y is calculated for a pixel by inserting the component values for the red, green, and blue components into Equation 5 given above.

The number of classes J included in a single partial range BL(m) is set to "10" in the preferred embodiment so that the number of brightness values Y included in a partial range BL(m) is greater than the number of gradation values (color numbers) in the scanned image SI for pixels constituting text (character). In general, the number of classes J of brightness values Y included in a single partial range BL(m) should be set greater than the number of gradation values in the scanned image SI for the pixels constituting text. It is particularly preferable that the number of classes J of brightness values Y included in a partial range BL(m) be set greater than the number of gradation values in the scanned image SI for the pixels constituting monochromatic text for reasons that will be described later.

After dividing the classes of brightness values Y in the histogram (gradation values) into N segments (where N is an integer of 2 or greater) in S1115, in S1120 the frequency rate calculation unit 135 initializes the variable m to "0". In S1125 the frequency rate calculation unit 135 increments the variable m by 1.

In S1130 of FIG. 7, the frequency rate calculation unit 135 calculates the sum of frequencies (total pixel count) H(m) in the partial range BL(m) from the histogram HG. The sum of frequencies H(m) is equivalent to the integral of brightness distribution within the partial range BL(m). In the example on the right side of FIG. 9(A) (enlarged view of a region ar1 in the histogram HG), the sum of frequencies H(11) in the partial range BL(11) is equivalent to the shaded area.

In S1135 the frequency rate calculation unit 135 determines whether the sum of frequencies H(m) calculated in S1130 is greater than a threshold Th2. If the sum of frequencies H(m) is less than or equal to the threshold Th2 (S1135: NO), the frequency rate calculation unit 135 advances to S1150 described later.

If the sum of frequencies H(m) is greater than the threshold Th2 (S1135: YES), in S1140 the frequency rate calculation unit 135 acquires the maximum frequency Ma(m) representing the largest frequency in the partial range BL(m) to calculate a section area S(m). Specifically, if m falls in the range from 1 to (N−1), the frequency rate calculation unit 135 calculates the section area S(m) by inputting the maximum frequency Ma(m) in the partial range BL(m) and the number of classes J in the partial range BL(m) into Equation 6 below. If m is equal to N, the frequency rate calculation unit 135 calculates the section area S(m) by inserting the maximum frequency Ma(m) in the partial range BL(m) and the number of classes J1 in the partial range BL(m) into Equation 7 below. As shown in Equations 6 and 7, the section area S(m) represents the product of the maximum frequency Ma(m) and the number of classes in the partial range BL(m) (J or J1).

$$S(m)=Ma(m) \times J \quad \text{(Equation 6)}$$

$$S(m)=Ma(m) \times J1 \quad \text{(Equation 7)}$$

In the enlarged view of the region ar1 on the right of FIG. 9(A), the section area S(11) in the partial range BL(11) is expressed by the product Ma(11)×J.

After calculating the section area S(m) in S1140, in S1145 the frequency rate calculation unit 135 calculates a frequency rate W(m) in the partial range BL(m) according to Equation 8 below. The frequency rate W(m) represents the degree of change in the histogram HG (brightness distribution) within the partial range BL(m). As is clear from Equation 8, the degree of change in the histogram HG can be considered small in the partial range BL(m) when the frequency rate W(m) is large (when the sum of frequencies H(m) is large) and large when the frequency rate W(m) is small (when the sum of frequencies H(m) is small).

$$W(m)=H(m)/S(m) \quad \text{(Equation 8)}$$

In S1150 the frequency rate calculation unit 135 determines whether m=N, i.e., whether the above process has been completed for all partial ranges BL(m). If m does not equal N (S1150: NO), the frequency rate calculation unit 135 repeats the above process from S1125.

When m equals N (S1150: YES), in S1155 the frequency rate calculation unit 135 sets a maximum frequency rate W to the largest value among the frequency rates W(1)-W(N) calculated above. In other words, the frequency rate calculation unit 135 selects a range having a smallest magnitude of change among a plurality of magnitudes of change in distribution within N ranges.

Figure 9B:
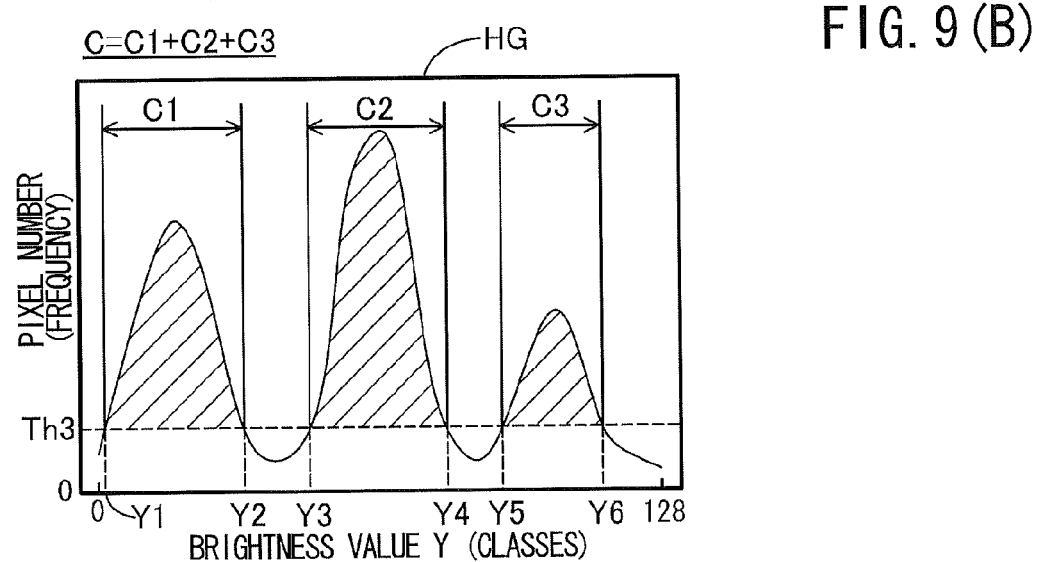
FIG. 9(B) is an explanatory diagram showing an example of histogram describing a color number.

In S1160 the color number calculation unit 140 calculates a color number C based on the above histogram HG (brightness distribution). FIG. 9(B) shows the histogram HG for describing the color number C. The color number C in the preferred embodiment is the number of effective classes for object pixels in the target region. The effective classes denote classes among all classes in the histogram HG (128 classes in the preferred embodiment) that possess a pixel count greater than or equal to a threshold Th3 (the classes corresponding to the shaded regions in FIG. 9(B)). Since the color of the pixels differs for different brightness values Y, the number of different classes represents the number of different colors (the number of types of colors). In the example of FIG. 9(B), the color number C is the sum of C1, C2, and C3 (C1=Y2−Y1, C2=Y4−Y3, C3=Y6−Y5).

In S1170 the density calculation unit 145 calculates a pixel density D for object pixels in the target region according to Equation 9 below. The pixel density D indicates the percentage of object pixels occupying an object image in the scanned image SI (pixels whose value in the corresponding binary image data is "1"). In Equation 9, No represents the number of object pixels in the target region selected in S700, and Ps represents the total number of pixels in the target region.

$$D=No/Ps \quad \text{(Equation 9)}$$

Figure 9C:
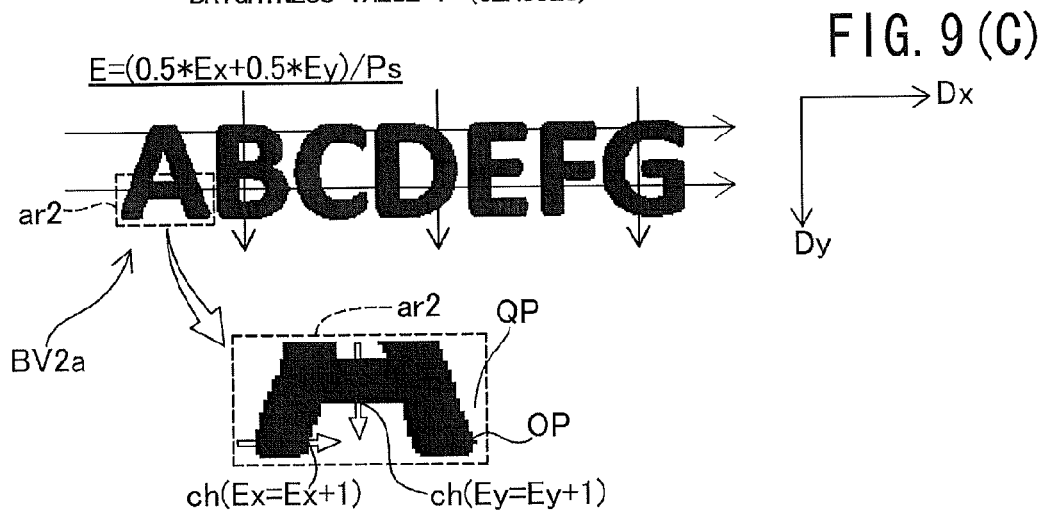
FIG. 9(C) is an explanatory diagram showing an example of binary image for describing an edge assessment value.

In S1180 of FIG. 7, the edge calculation unit 150 executes an edge assessment value calculation process for calculating an edge assessment value E. The edge calculation unit 150 calculates the edge assessment value E using a binary image of the target region generated in S1107. FIG. 9(C) shows a binary image BV2a as an example for describing the edge assessment value E. The binary image BV2a was generated by thresholding the character string Ob2a of the text object image Ob2. The dark regions in the binary image BV2a correspond to object pixels OP, and the white regions correspond to non-object pixels QP. As shown in FIG. 9(C), the edge calculation unit 150 searches in both the first direction Dx (horizontal direction in the drawing) and the second direction Dy (vertical direction in the drawing) for regions that change from an object pixel OP to a non-object pixel QP (hereinafter called change regions ch). The edge calculation unit 150 counts the number of change regions ch in the first direction Dx as a first edge assessment number Ex and counts the number of change regions ch in the second direction Dy as a second edge assessment number Ey. The edge calculation unit 150 then calculates the edge assessment value E based on the first edge assessment number Ex and second edge assessment number Ey. The bottom portion of FIG. 9(C) is an enlarged view of a region ar2 within the binary image BV2a. Searching for change regions ch within this region produces a count of 1 for each of the first edge assessment number Ex and second edge assessment number Ey. The edge assessment value calculation process will be described next in greater detail.

Figure 10:
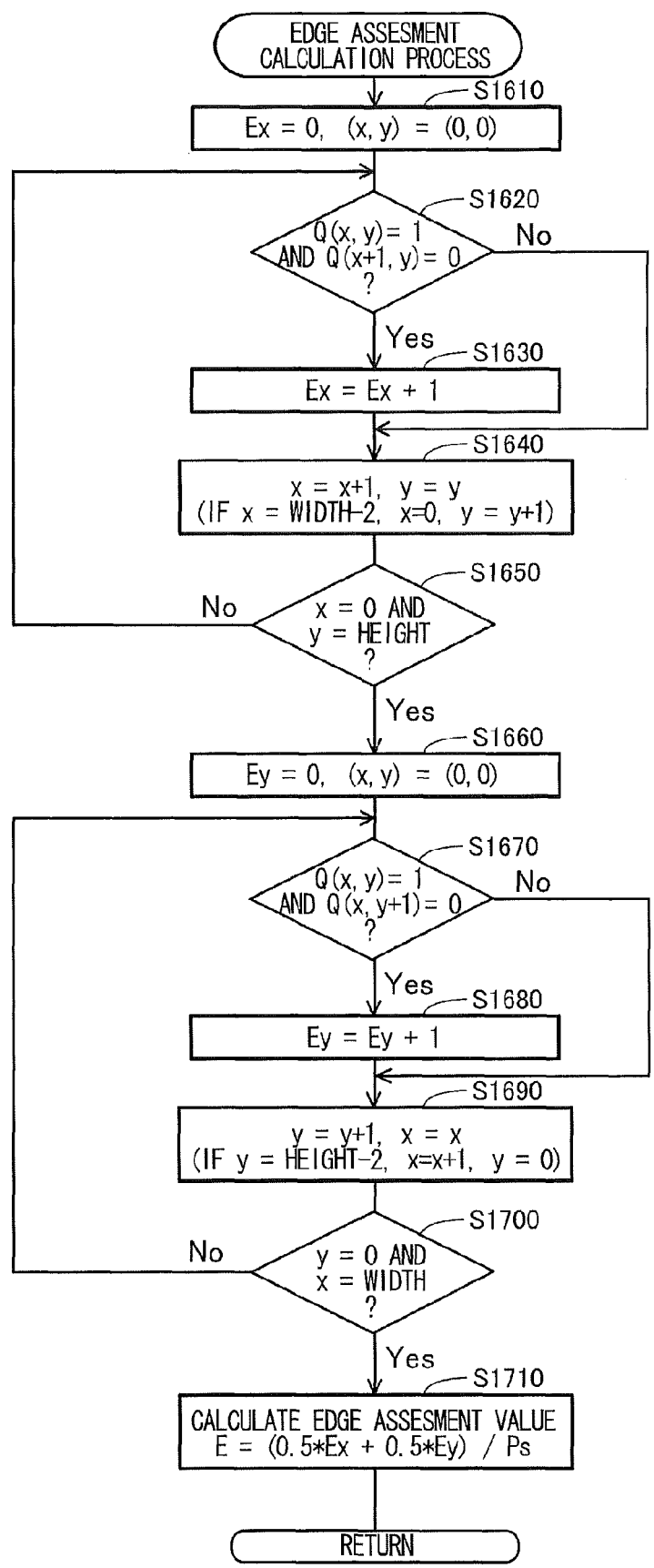
FIG. 10 is a flowchart illustrating steps in an edge assessment calculation process of the region determination process shown in FIG. 7.

FIG. 10 is a flowchart illustrating steps in the edge assessment value calculation process. In S1610 at the beginning of FIG. 10, the edge calculation unit 150 initializes the value of the first edge assessment number Ex to "0" and sets the position of the target region (x, y) to "(0, 0)."

In S1620 the edge calculation unit 150 determines whether the target pixel (x, y) corresponds to a change region ch. Specifically, the edge calculation unit 150 references the binary image of the target region to determine whether a pixel value Q(x, y) for the target pixel (x, y) is "1" and whether a pixel value Q(x+1, y) for a pixel (x+1, y) positioned next to the target pixel (x, y) in the first direction Dx is "0". If the edge calculation unit 150 determines that either pixel value Q(x, y) is not "1" or pixel value Q(x+1, y) is not "0", i.e., that the target pixel (x, y) is not a change region ch (S1620: NO), the edge calculation unit 150 advances to S1640.

However, if the pixel value Q(x, y) is "1" and the pixel value Q(x+1, y) is "0", indicating that the target pixel (x, y) is a change region ch (S1620: YES), in S1630 the edge calculation unit 150 increments the first edge assessment number Ex by 1.

In S1640 the edge calculation unit 150 updates the pixel position by shifting the target pixel one position in the first direction Dx (x=x+1, y=y). However, if x (width−2), where width is the number of pixels in the first direction Dx of the binary image, shifting the target pixel in the first direction Dx would place the new target pixel at the last position in the first direction Dx. Accordingly, in this situation the edge calculation unit 150 shifts the target pixel one place in the second direction Dy and back to the initial position of the first direction Dx (x=0, y=y+1).

In S1650 the edge calculation unit 150 determines whether x=0 and y=height, where height is the number of pixels in the second direction Dy of the binary image. In other words, the edge calculation unit 150 determines whether all rows have been searched for change regions ch in the first direction Dx. If the edge calculation unit 150 determines that x does not equal 0 or that y does not equal height, i.e., that not all rows have been searched for change regions ch in the first direction Dx (S1650: NO), the edge calculation unit 150 returns to S1620.

However, if x=0 and y=height, indicating that all rows have been searched for change regions ch in the first direction Dx (S1650: YES), in S1660 the edge calculation unit 150 sets the value of the second edge assessment number Ey to "0" and the position of the target pixel (x, y) to "(0, 0)."

In S1670 the edge calculation unit 150 determines whether the target pixel (x, y) corresponds to a change region ch in the binary image of the target region. Specifically, the edge calculation unit 150 determines whether the pixel value Q(x, y) for every target pixel (x, y) is "1" and whether the pixel value Q(x, y+1) for a pixel (x, y+1) positioned adjacent to the target pixel (x, y) in the second direction Dy is "0". If the edge calculation unit 150 determines that either pixel value Q(x, y) is not equal to "1" or pixel value Q(x, y+1) is not equal to "0", i.e., if the target pixel (x, y) does not correspond to a change region ch (S1670: NO), the edge calculation unit 150 jumps to S1690. However, if the pixel value Q(x, y) is "1" and the pixel value Q(x, y+1) is "0", indicating that the target pixel (x, y) is a change region ch (S1670: YES), in S1680 the edge calculation unit 150 increments the second edge assessment number Ey by 1.

In S1690 the edge calculation unit 150 updates the pixel position to shift the target pixel in the second direction Dy (y=y+1, x=x). However, if x=(height−2), shifting the target pixel in the second direction Dy would set the new target pixel to the last position in the second direction Dy. Accordingly, in this situation the edge calculation unit 150 shifts the target pixel in the first direction Dx and back to the initial position in the second direction Dy (y=0, x=x+1).

In S1700 the edge calculation unit 150 determines whether y=0 and x width, i.e., whether all columns have been searched for change regions ch in the second direction Dy. If the edge calculation unit 150 determines that either y does not equal "0" or x does not equal "width," indicating that not all columns have been searched for change regions ch in the second direction Dy (S1700: NO), the edge calculation unit 150 returns to S1670.

However, if y="0" and x="width", indicating that all columns have been searched for change regions ch in the second direction Dy (S1700: YES), in S1710 the edge calculation unit 150 calculates the edge assessment value E using Equation 10 below. As before, the value Ps in Equation 10 denotes the total number of pixels in the target region selected in S700 (i.e., the product of width and height). The edge assessment value E can be considered the number of edges per unit area (in units of pixels) in the target region.

$$E=(0.5 \times Ex+0.5 \times Ey)/Ps \qquad \text{(Equation 10)}$$

FIG. 11 shows the determination table 292 indicating conditions for determining the type of an object image in the region determination process. Next, the process for determining the type of an object image will be described with reference to the determination table 292 in FIG. 11. This process is illustrated in the flowchart of FIG. 8.

After the edge calculation unit 150 calculates the edge assessment value E in S1180 of FIG. 7, in S1185 of FIG. 8 the image type determination unit 155 determines whether the maximum frequency rate W is greater than or equal to a threshold Wth. In other words, in S1185 the image type determination unit 155 determines whether the smallest magnitude of change is smaller than the reference value. If the maximum frequency rate W is greater than or equal to the threshold Wth (S1185: YES), in S1190 the image type determination unit 155 determines whether the color number C is greater than or equal to a threshold Cth. If the color number C is greater than or equal to the threshold Cth (S1190: YES), in S1200 the image type determination unit 155 determines that the object image in the target region is of type "photo" (see FIG. 11).

However, if the color number C is less than the threshold Cth (S1190: NO), in S1205 the image type determination unit 155 determines whether the pixel density D is greater than or equal to a threshold Dth. If the pixel density D is greater than or equal to the threshold Dth (S1205: YES), in S1210 the image type determination unit 155 determines that the object image is of type "drawing" (see FIG. 11).

However, if the pixel density D is less than the threshold Dth (S1205: NO), in S1215 the image type determination unit 155 determines whether the edge assessment value E is greater than or equal to a threshold Eth. If the edge assessment value E is greater than or equal to the threshold Eth (S1215: YES), in S1220 the image type determination unit 155 determines that the object image is a text image (see FIG. 11).

However, if the edge assessment value E is less than the threshold Eth (S1215: NO), in S1230 the image type determination unit 155 determines that the object image is of type "drawing."

Returning to S1185, if the image type determination unit 155 determines that the maximum frequency rate W is less than the threshold Wth (S1185: NO), in S1225 the image type determination unit 155 determines whether the color number C is greater than or equal to the threshold Cth. If the color number C is greater than or equal to the threshold Cth (S1225: YES), in S1230 the image type determination unit 155 determines that the object image is of type "drawing" (see FIG. 11).

However, if the color number C is less than the threshold Cth (S1225: NO), in S1235 the image type determination unit 155 determines whether the pixel density D is greater than or equal to the threshold Dth. If the pixel density D is greater than or equal to the threshold Dth (S1235: YES), in S1230 the image type determination unit 155 determines that the object image is of type "drawing" (see FIG. 11).

However, if the pixel density D is less than the threshold Dth (S1235: NO), in S1240 the image type determination unit 155 determines whether the edge assessment value E is greater than or equal to the threshold Eth. If the edge assessment value E is greater than or equal to the threshold Eth (S1240: YES), in S1245 the image type determination unit 155 determines that the object image is of type "text" (see FIG. 11).

However, if the edge assessment value E is less than the threshold Eth (S1240: NO), in S1250 the image type determination unit 155 determines that the object image is of type "drawing" (see FIG. 11).

After completing any of steps S1200, S1210, S1220, S1230, S1245, and S1250, in S1300 of FIG. 2, the image type determination unit 155 determines whether all the non-solid regions have been processed. If there remain unprocessed non-solid regions (S1300: NO), the image type determination unit 155 returns to S700. When all non-solid regions have been processed (S1300: YES), the image type determination unit 155 ends the image process. After the image process is completed, the scanner driver 100 may execute an image adjustment process on each region whose type has been identified based on the identified type. For example, the scanner driver 100 may perform processes to correct white balance, brightness, and the like in regions of the image identified as photo images, and may perform processes to enhance sharpness and contrast in regions identified as text images. The scanner driver 100 may also execute compression processes for each image region whose type has been identified based on the identified type.

A-3. Examples of Text Images, Drawing Images, and Photo Images

Here, examples of non-solid regions will be described for cases in which the type of target image is identified as a text image, drawing image, and photo image.

Example of a Text Images

Figure 12A:
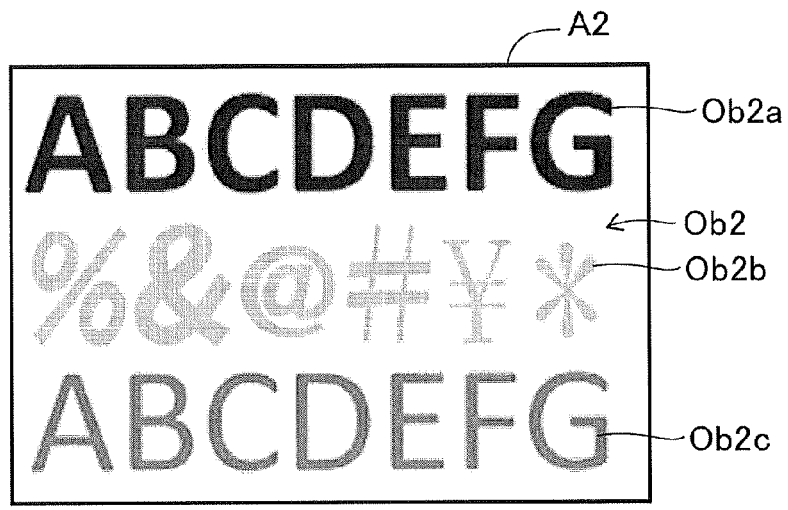
FIG. 12(A) is an explanatory diagram showing an example of an image region representing a text.
Figure 12B:
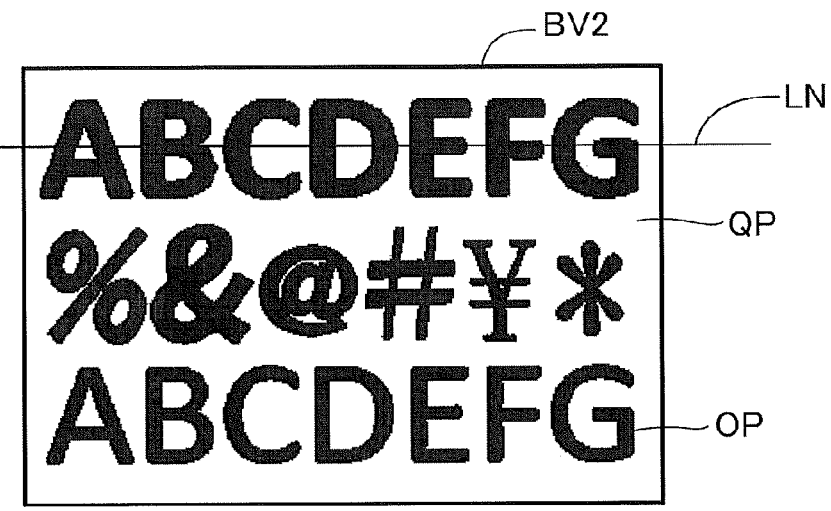
FIG. 12(B) is an explanatory diagram showing a binary image into which the image region shown in FIG. 12(A) is converted.
Figure 12C:
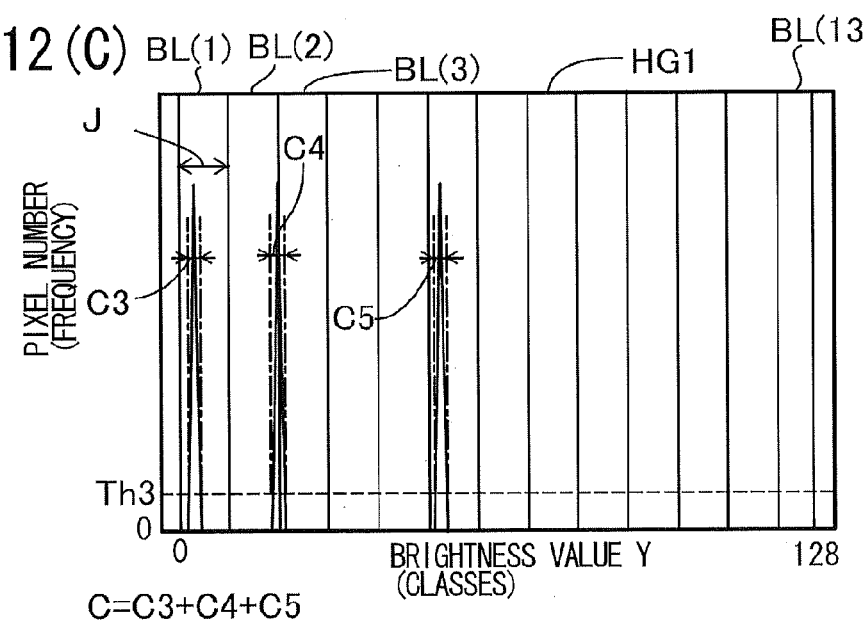
FIG. 12(C) is a histogram for brightness distribution of pixels in the image region shown in FIG. 12(A)

FIGS. 12(A)-12(C) are explanatory diagrams showing a typical example of a non-solid region having the image type "text." FIG. 12(A) shows the non-solid region A2 in the scanned image SI of FIG. 3 that includes the text object image Ob2. FIG. 12(B) shows a binary image BV2 produced by converting the non-solid region A2 to binary values. FIG. 12(C) shows a histogram HG1 for the brightness distribution of object pixels OP in the non-solid region A2.

The non-solid region A2 in FIG. 12(A) includes the three character strings Ob2a, Ob2b, and Ob2c, each depicted in a different color. Consequently, the histogram HG1 of the non-solid region A2 shown in FIG. 12(C) has three peaks of brightness values corresponding to the three character strings. The color number C in the histogram HG1 is expressed by the sum of numbers C3, C4, and C5 of effective classes corresponding to the character strings Ob2a, Ob2b, and Ob2c. Since text images are typically rendered with few colors, the color number C tends to be smaller when the image type is "text" than when the image type is "photo."

Further, as in the example shown in FIG. 12(B), the surface area occupied by the object pixels OP is smaller than the surface area occupied by the non-object pixels QP. Since characters are normally configured of lines and rarely include filled or solid regions, the percentage of the overall surface area of the region occupied by the object image tends to be relatively small for images of type "text" and, hence, the object image tends to have a smaller pixel density D of object pixels OP than images of type "photo" or "drawing." Further, since text images have a complex arrangement of lines and curves, a line passing through a binary image of the text image will have many areas in which an object pixel OP neighbors a non-object pixel QP (corresponding to the change region ch described above), as is illustrated with the line LN intersecting the binary image BV2 in FIG. 12(B). Accordingly, the edge assessment value E tends to be higher in images of type "text" than images of type "photo" or "drawing."

As described in the region determination process of FIG. 8 with reference to the determination table 292 in FIG. 11, the scanner driver 100 of the preferred embodiment determines that an object region is of type "text" when the color number C is less than the threshold Cth, the pixel density D is less than the threshold Dth, and the edge assessment value E is greater than or equal to the threshold Eth. Hence, the scanner driver 100 can accurately identify the type of an object image having characteristics of a text image when the color number C is relatively small, the pixel density D is relatively small, and the edge assessment value E is relatively high.

Example of a Drawing Image

Figure 13A:
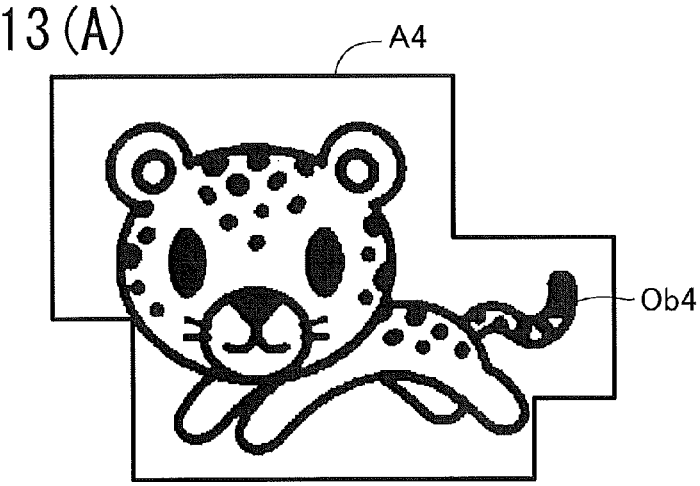
FIG. 13(A) is an explanatory diagram showing an example of an image region representing a drawing.
Figure 13B:
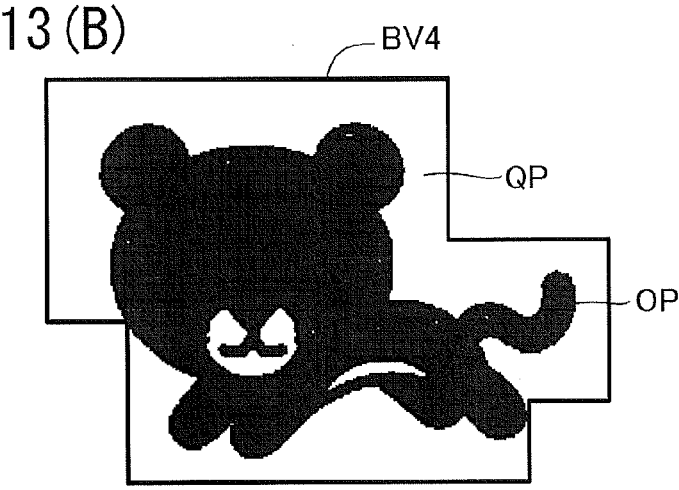
FIG. 13(B) is an explanatory diagram showing a binary image into which the image region shown in FIG. 13(A) is converted.
Figure 13C:
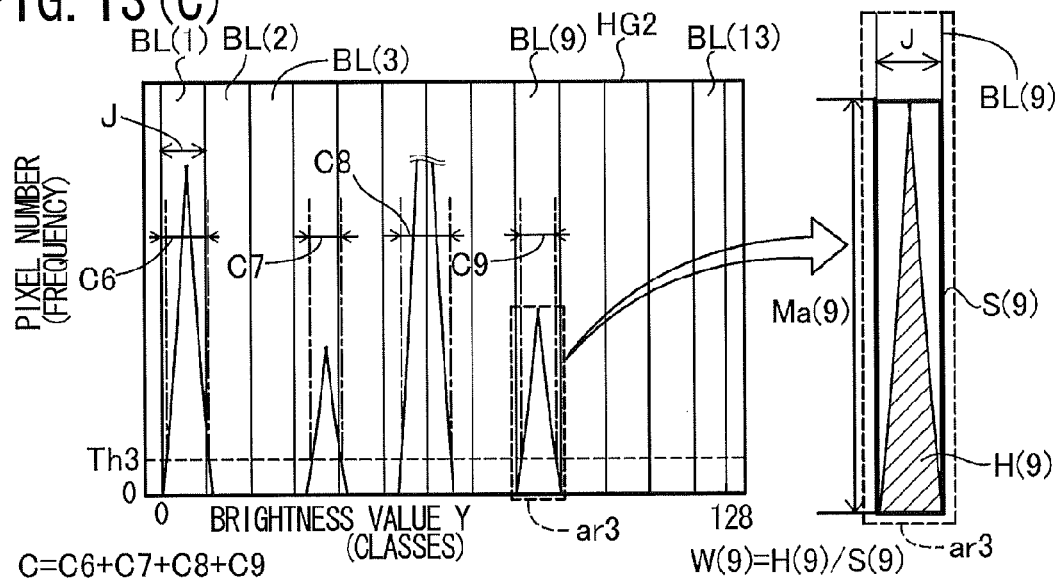
FIG. 13(C) is a histogram for brightness distribution of pixels in the image region shown in FIG. 13(A)

FIGS. 13(A)-13(C) are explanatory diagrams showing an example of a non-solid region with the image type "drawing." FIG. 13(A) shows the non-solid region A4 of the scanned image SI in FIG. 3 that includes the drawing object image Ob4. FIG. 13(B) shows a binary image BV4 obtained by converting the non-solid region A4 to binary values. FIG. 13(C) shows a histogram HG2 indicating the brightness distribution for object pixels OP in the non-solid region A4.

The drawing image shown in FIG. 13(A) includes a region whose colors change gradually. This type of drawing image tends to have much of the same color, albeit with gradual changes, but has more colors than a text image. Thus, the histogram (brightness distribution) for a drawing image will likely have large degrees of change in localized regions. The enlarged view of a region ar3 on the right side of FIG. 13(C) indicates that the frequency rate W(9) is small for the partial range BL(9) in the histogram HG2. In other words, the large degree of change in the histogram HG2 is localized. The color number C in the histogram HG2 is expressed by the sum of numbers C6, C7, C8, and C9 of effective classes.

Therefore, as described in the region determination process of FIG. 8 with reference to the determination table 292 in FIG. 11, the scanner driver 100 according to the preferred embodiment determines that an object image is of type "drawing" when the maximum frequency rate W is less than the threshold Wth and the color number C is greater than or equal to the threshold Cth. Accordingly, the scanner driver 100 can accurately identify the type of an object image having characteristics of a drawing image, as described above, i.e., when large degrees of change in the histogram HG2 are localized but the color number C is relatively high.

Example of a Photo Image

Figure 14A:
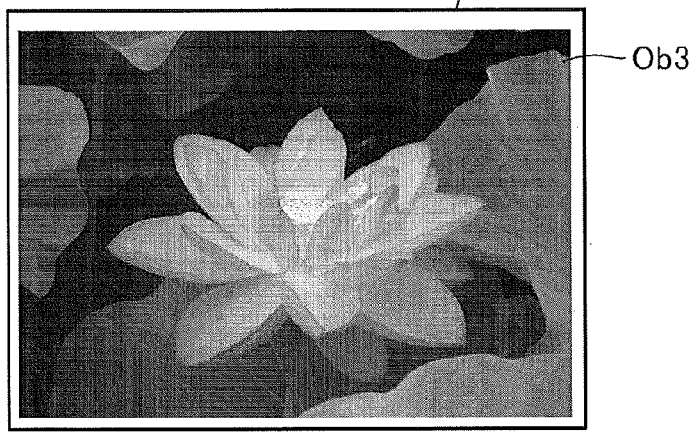
FIG. 14(A) is an explanatory diagram showing an example of an image region representing a photo.
Figure 14B:
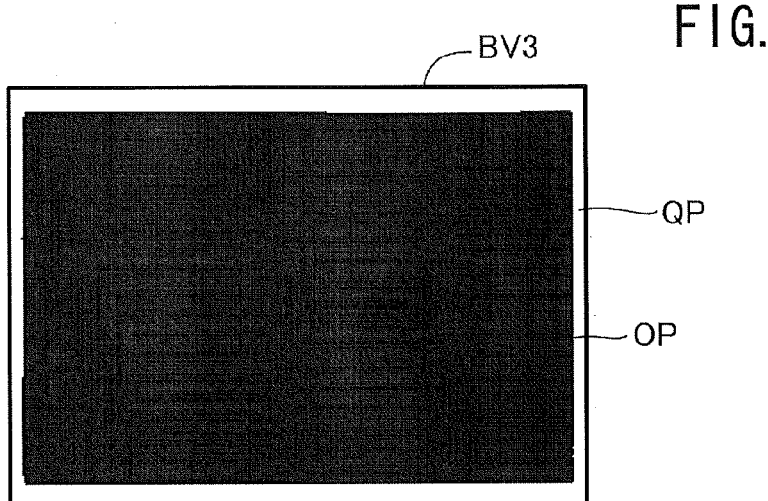
FIG. 14(B) is an explanatory diagram showing a binary image into which the image region shown in FIG. 14(A) is converted.
Figure 14C:
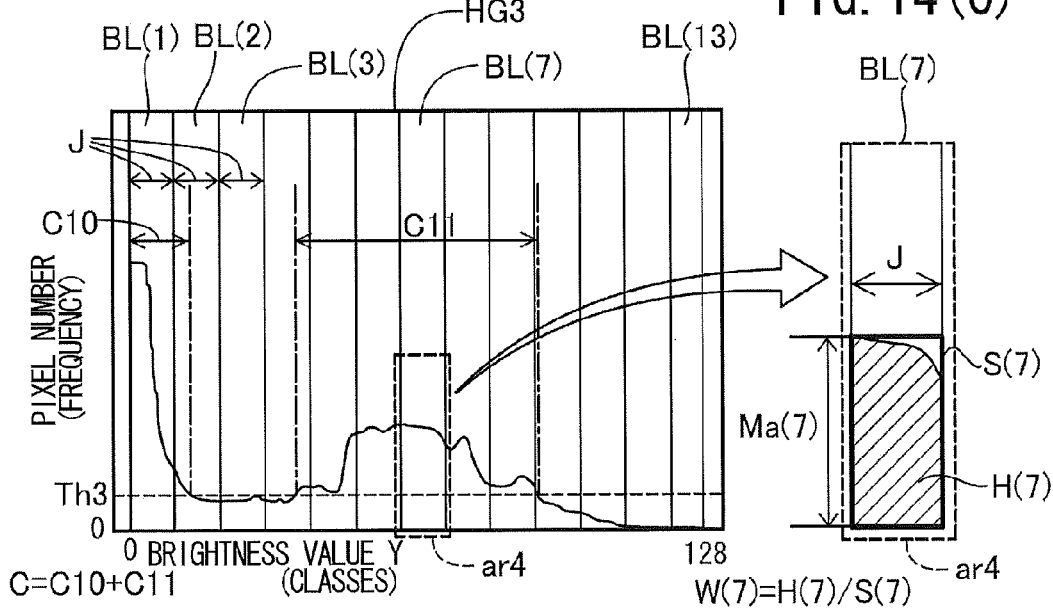
FIG. 14(C) is a histogram for brightness distribution of pixels in the image region shown in FIG. 14(A).

FIGS. 14(A)-14(C) are explanatory diagrams showing an example of a non-solid region having the image type "photo." FIG. 14(A) shows the non-solid region A3 of the scanned image SI that includes the photo object image Ob3. FIG. 14(B) shows a binary image BV3 obtained by converting the non-solid region A3 to binary values. FIG. 14(C) shows a histogram HG3 depicting the brightness distribution of object pixels OP in the non-solid region A3. The photo image shown in FIG. 14(A) includes a dark region that was underexposed.

Typical photo images tend to have a larger number of colors than text and drawing images. Hence, it is easy to determine when an image is of type "photo."

However, since the photo image in FIG. 14(A) has a smaller color number C than a typical photo image, the type of image can be more difficult to determine. This type of problem is not limited to underexposed photo images having dark regions, but may also occur in photo images having bright regions from overexposure and photo images with a substantially uniform background color. The color number C in the histogram HG3 is expressed by the sum of numbers C10 and C11 of effective classes.

However, when looking at only a portion of partial ranges BL in the histogram for a photo image, even a photo image having a dark region, as in the example of FIG. 14(A), may show relatively small degrees of change in brightness distribution as is typically seen in a photo image. The enlarged view of a region ar4 on the right side of FIG. 14(C) indicates a large frequency rate W(7) for the partial range BL(7) in the histogram HG3 and shows that the localized degree of change in the histogram HG3 is small.

Hence, as described in the region determination process of FIG. 8 with reference to the determination table 292 in FIG. 11, the scanner driver 100 according to the preferred embodiment determines that an object image is of type "photo" when the maximum frequency rate W is greater than or equal to the threshold Wth and the color number C is greater than or equal to the threshold Cth. Accordingly, the scanner driver 100 can accurately identify an object image of type "photo," even for photo images that have a large localized degree of change in the histogram HG2.

In the region determination process of the preferred embodiment described above with reference to FIGS. 7 and 8, the scanner driver 100 can determine that an object image is of type "photo" when the maximum frequency rate W is greater than or equal to the threshold Wth in a partial range BL(m) (see FIG. 9(A)) that includes fewer gradation values than the number of gradation values between the minimum brightness value Y of "0" and the maximum brightness value Y of "255" from among the brightness values Y represented by the object pixels in the target region (S1185 of FIG. 8). In other words, the scanner driver 100 may determine that an object image is a photo image when the degree of change in frequencies (pixel counts) in a histogram (brightness distributions) is smaller than a reference value within a partial range BL(m). By requiring that the degree of change in frequencies be smaller than a threshold for a partial range BL(m) in the histogram, this method improves the accuracy for determining whether an object image is a photo image, thereby improving the precision for determining the type of an object image.

In the region determination process of FIG. 8 according to the preferred embodiment, an object image can be determined to be a photo image on the condition that the frequency rate W(m) in the partial range BL(m) possessing the maximum frequency rate W is greater than or equal to the threshold Wth. Since this method enables the seamier driver 100 to determine photo images from a histogram without using partial ranges BL(m) that have a high degree of change in frequencies (pixel counts) in very localized regions, the scanner driver 100 can determine that object images are photo images with greater accuracy, even when the photo images are atypical (i.e., have a large, localized degree of change in the histogram (brightness distribution)).

In the preferred embodiment, the number of brightness values Y included in each partial range BL(m) set in S1115 of the region determination process (FIG. 7) is the same for at least partial ranges BL(1)-BL(N−1). Hence, when calculating the section area S(m) and sum of frequencies H(m) to derive the frequency rate W(m), the number of classes of brightness values Y can be fixed to facilitate implementation of a region determination process having a process for calculating the frequency rate W(m).

In the region determination process of the preferred embodiment (FIG. 7), the maximum frequency rate W is computed using partial ranges BL(m) whose sum of frequencies H(m) is greater than the threshold Th2, while excluding partial ranges BL(m) whose sum of frequencies H(m) is less than or equal to the threshold Th2 (S1135 of FIG. 7). In other words, partial ranges BL(m) whose sum of frequencies H(m) is greater than the threshold Th2 are used for determining photo images. In this way, the maximum frequency rate W is computed without using partial ranges BL(m) whose sum of frequencies H(m) is less than or equal to the threshold Th2, meaning partial ranges BL(m) that do not represent the characteristics of the image, thereby enhancing the precision of computing the maximum frequency rate W.

In the region determination process of the preferred embodiment (FIGS. 7 and 8), the maximum frequency rate W is computed using the section area S(m) calculated in S1140 and the sum of frequencies H(m) calculated in S1130 to determine whether an object image is a photo image. Thus, a suitable maximum frequency rate W can be computed from the section area S(m) and the sum of frequencies H(m), without requiring a process to smooth the histogram, even when the histogram has subtle changes (for example, when the changes in frequencies produces a jagged histogram). The resulting maximum frequency rate W is suitable for determining whether the object image is a photo image.

When an object image is a text image, the histogram (brightness distribution) for this image may have high degrees of localized change. Therefore, in the preferred embodiment the number of brightness values Y included in a partial range BL(m) is set to be larger than the number of gradation values for pixels in the scanned image SI constituting text. In this way, when an object image is a text image, the partial ranges BL(m) are wider than width of peaks (widths between the minimum and maximum brightness values Y of the peaks) in a histogram produced from the text image. Accordingly, the scanner driver 100 can calculate a small maximum frequency rate W from the text image, reducing the possibility that the text image will be incorrectly identified as another type.

In S1215 and S1240 of the region determination process (FIG. 8), the image type determination unit 155 determines that the object image is of type "text" when the edge assessment value E is greater than or equal to the threshold Eth, and determines that the object image is of type "drawing" when the edge assessment value E is less than the threshold Eth, enabling the image type determination unit 155 to identify text images appropriately.

The number of classes J included in a single partial range BL(m) is set to "10" in the preferred embodiment, which is normally smaller than the number of classes corresponding to the number of brightness values (200, for example) included between a minimum brightness value (30, for example) and a maximum brightness value (230, for example) for the range of brightness values distributed in a photo image. Generally, the number of brightness values included in a single partial range BL(m) (i.e., the number of classes J) is preferably set smaller than the number of brightness values (number of classes) included between minimum and maximum brightness values (classes) for a range of brightness values distributed in a typical photo image (an image that should be determined to be a photo). In this way, the frequency rate calculation unit 135 can detect a portion of a histogram having a small degree of change in pixel counts using at least one of the partial ranges BL(m). A predetermined static value may be used as the number of classes J for a single partial range BL(m).

B. Variations of the Embodiment

While the invention has been described in detail with reference to the embodiment thereof, it would be apparent to those skilled in the art that various changes and modifications may be made therein without departing from the spirit of the invention.

(1) In the region determination process of the preferred embodiment (FIGS. 7 and 8), the scanner driver 100 can determine that an object image is a photo image on the condition that the frequency rate W(m) in the partial range BL(m) having the maximum frequency rate W is greater than or equal to the threshold Wth, but the invention is not limited to this condition. For example, the object image may be determined to be a photo image on the condition that the frequency rate W(m) in at least one of the partial range BL(m) is greater than or equal to the threshold Wth. In other words, the object image is found to be a photo image when the degree of change in frequencies (pixel counts) in at least one partial range BL(m) of the histogram is smaller than a reference value. Hence, photo images can be detected without using partial ranges BL(m) in the histogram having large degrees of localized change in frequencies, thereby detecting photo images with greater accuracy, even when the photo images are atypical (photo images having large, localized degrees of change in their histogram).

The image type determination unit 155 may also determine an object image to be a photo image on the condition that the number of partial ranges BL(m) whose frequency rate W(m) is greater than or equal to the threshold Wth is greater than a prescribed number.

(2) In the region determination process of the preferred embodiment, the image type determination unit 155 can determine that an object image is of type photo when the frequency rate W(m) in a partial range BL(m) is greater than or equal to the threshold Wth (S1185: YES in FIG. 8), but the present invention is not limited to this condition. For example, the image type determination unit 155 may determine that an object image is a photo image on the condition that the value of maximum change is no greater than a threshold value, the value of maximum change being obtained by subtracting the smallest frequency (pixel count) from the largest frequency in a single partial range BL(m). Alternatively, the image type determination unit 155 may determine that an object image is a photo image on the condition that the distribution of frequencies in a single partial range BL(m) is within a threshold value.

Generally speaking, an object image may be determined to be a photo image when the object image satisfies a photo condition requiring that the degree of change in pixel counts within a partial range BL(m) of a histogram be smaller than a threshold.

(3) In the preferred embodiment, the image type determination unit 155 uses the number of edges per unit area in a target region calculated in the edge assessment value calculation process of FIG. 10 as the edge assessment value E in the region determination process of FIG. 8, but the present invention is not limited to this method. For example, the image type determination unit 155 may employ one of the first and second edge assessment numbers Ex and By as the edge assessment value E instead.

(4) In the preferred embodiment, each class of brightness values Y in the histogram is configured of two of the possible 256 gradations, but each class of brightness values Y may instead include three or more gradations. Increasing the number of gradations in this way increases the compression ratio for compressing brightness distribution data representing the histogram.

(5) The device implementing the image-processing functions of the scanner driver 100 is not limited to the computer 200 described in the preferred embodiment, but may be a multifunction peripheral, digital camera, scanner, or the like. Further, the image-processing functions of the preferred embodiment may be implemented on a single device or may be shared among a plurality of devices connected to each other over a network. In the latter case, the entire system of devices that implement the image-processing functions corresponds to the image processing device of the invention.

What is claimed is:

1. An image processing device comprising:
   a processor; and
   a memory storing computer-readable instructions therein, the computer-readable instructions, when executed by the processor, causing the image processing device to perform:
   acquiring the image data representing an image, the image data including a plurality of sets of pixel data each having a multiple-level gradation value, each gradation value falling within a predetermined range between and inclusive of a minimum gradation value and a maximum gradation value, a predetermined number of levels of gradation value falling within the predetermined range;
   setting a plurality of partial ranges of levels of gradation value, a respective number of levels of gradation value in each of the plurality of partial ranges being smaller than the predetermined number, and the plurality of partial ranges being different from one another; and determining that the image is a photograph image based at least in part on the image meeting a first criterion that a smallest degree of change among a plurality of degrees of change in distribution of gradation values of the plurality of partial ranges is smaller than a reference value, each of the plurality of degrees of change in the distribution of gradation values being determined based on a pixel number of sets of pixel data whose levels of gradation value fall within a respective one of the plurality of partial ranges.

2. The image processing device according to claim 1, wherein setting a plurality of partial ranges comprises: dividing the predetermined range into the plurality of partial ranges each containing the respective number of levels of gradation value.

3. The image processing device according to claim 1, wherein the number of pixels in each said plurality of ranges of levels of gradation value is greater than a prescribed number.

4. The image processing device according to claim 1, wherein determining each of the plurality of degrees of change based on a pixel number of sets of pixel data comprises, for each partial range, determining a ratio of (1) the number of pixel data whose level of gradation value falls in the partial range and (2) the product of the respective number of levels of gradation value in the partial range and the mode value of the gradation levels in the partial range.

5. The image processing device according to claim 1, wherein the predetermined range is a range between and inclusive of a maximum gradation value and a minimum gradation value that are included in the image.

6. The image processing device according to claim 1, wherein the predetermined range is a range between and inclusive of a maximum gradation value and a minimum gradation value that the image processing device is configured to represent.

7. The image processing device according to claim 1, wherein the respective number of levels of gradation value in each of the plurality of partial ranges is greater than the number of levels of gradation value included in a character area in the image, the character area representing a character.

8. The image processing device according to claim 1, wherein the processor further performs calculating an edge assessment value in the image;
wherein the determining determines that the image is a character image when the image meets a second criterion that the edge assessment value is greater than or equal to a second reference value;
wherein the determining determines that the image is not the character image when the image does not meet the second criterion.

9. A non-transitory computer readable storage medium storing instructions, when executed by a processor, causing an image processing device to perform:
acquiring image data representing an image, the image data including a plurality of sets of pixel data each having a multiple-level gradation value, each gradation value falling within a predetermined range between and inclusive of a minimum gradation value and a maximum gradation value, a predetermined number of levels of gradation value falling within the predetermined range;
setting a plurality of partial ranges of levels of gradation value, a respective number of levels of gradation value in each of the plurality of partial ranges being smaller than the predetermined number, and the plurality of partial ranges being different from one another; and
determining that the image is a photograph image based at least in part on the image meeting a first criterion that a smallest degree of change among a plurality of degrees of change in distribution of gradation values of the plurality of partial ranges is smaller than a reference value, each of the plurality of degrees of change in the distribution of gradation values being determined based on a pixel number of sets of pixel data whose levels of gradation value fall within a respective one of the plurality of partial ranges.

10. An image processing device comprising:
a processor; and
a memory storing computer-readable instructions therein, the computer-readable instructions, when executed by the processor, causing the image processing device to perform:
acquiring the image data representing an image, the image data including a plurality of sets of pixel data each having a multiple-level gradation value, each gradation value falling within a predetermined range between and inclusive of a minimum gradation value and a maximum gradation value, a predetermined number of levels of gradation value falling within the predetermined range;
setting a plurality of partial ranges of levels of gradation value, a respective number of levels of gradation value in each of the plurality of partial ranges being smaller than the predetermined number, and the plurality of partial ranges being different from one another; and
determining that the image is a photograph image based at least in part on the image meeting a first criterion that a degree of change in distribution of gradation values of a first partial range of the plurality of partial ranges is smaller than a reference value, the distribution of gradation value indicating a pixel number of sets of pixel data for each level of the gradation value falling within said first partial range and wherein said degree of change being determined by a ratio of (1) the number of pixel data whose level of gradation value falls in said first partial range and (2) the product of the respective number of levels of gradation value in said first partial range and the mode value of the gradation levels in said first partial range.

11. The image processing device according to claim 10, wherein setting a plurality of partial ranges comprises: dividing the predetermined range into the plurality of partial ranges each containing the respective number of levels of gradation value.

12. The image processing device according to claim 10, wherein the number of pixels in each said plurality of ranges of levels of gradation value is greater than a prescribed number.

13. The image processing device according to claim 10, wherein the predetermined range is a range between and inclusive of a maximum gradation value and a minimum gradation value that are included in the image.

14. The image processing device according to claim 10, wherein the predetermined range is a range between and inclusive of a maximum gradation value and a minimum gradation value that the image processing device is configured to represent.

15. The image processing device according to claim 10, wherein the respective number of levels of gradation value in in said first partial range is greater than the number of levels of gradation value included in a character area in the image, the character area representing a character.

16. The image processing device according to claim 10, wherein the processor further performs calculating an edge assessment value in the image;
   wherein the determining determines that the image is a character image when the image meets a second criterion that the edge assessment value is greater than or equal to a second reference value;
   wherein the determining determines that the image is not the character image when the image does not meet the second criterion.

\* \* \* \* \*